Figure 1:
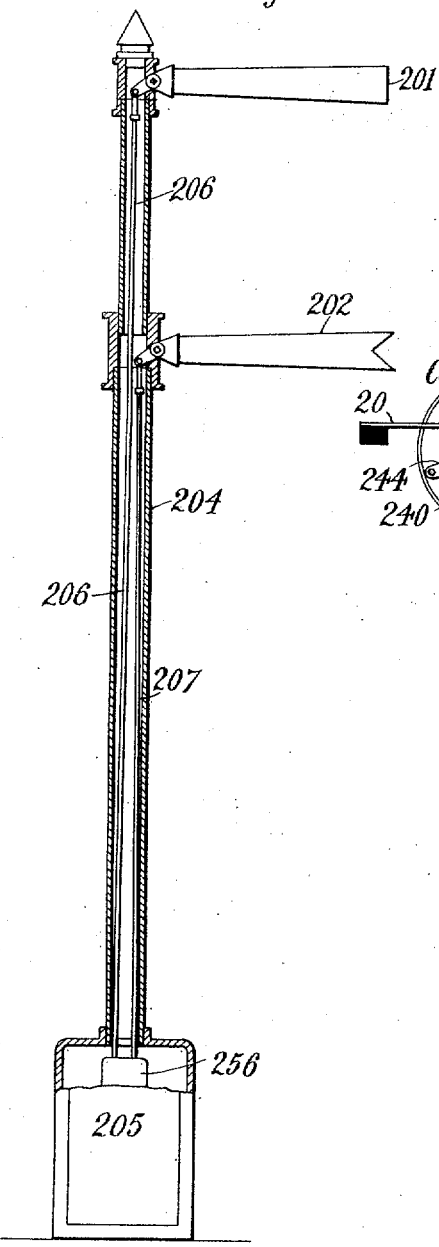

No. 754,363. PATENTED MAR. 8, 1904.
H. BEZER.
RAILWAY SIGNALING SYSTEM.
APPLICATION FILED FEB. 4, 1903.
NO MODEL. 9 SHEETS—SHEET 1.

Witnesses:

Inventor
Henry Bezer
by Henry D. Williams Atty

No. 754,363. PATENTED MAR. 8, 1904.
H. BEZER.
RAILWAY SIGNALING SYSTEM.
APPLICATION FILED FEB. 4, 1903.
NO MODEL. 9 SHEETS—SHEET 2.

Witnesses:
Livingston Curry
J. H. Barnes

Inventor
Henry Bezer
by Henry D. Williams Att'y

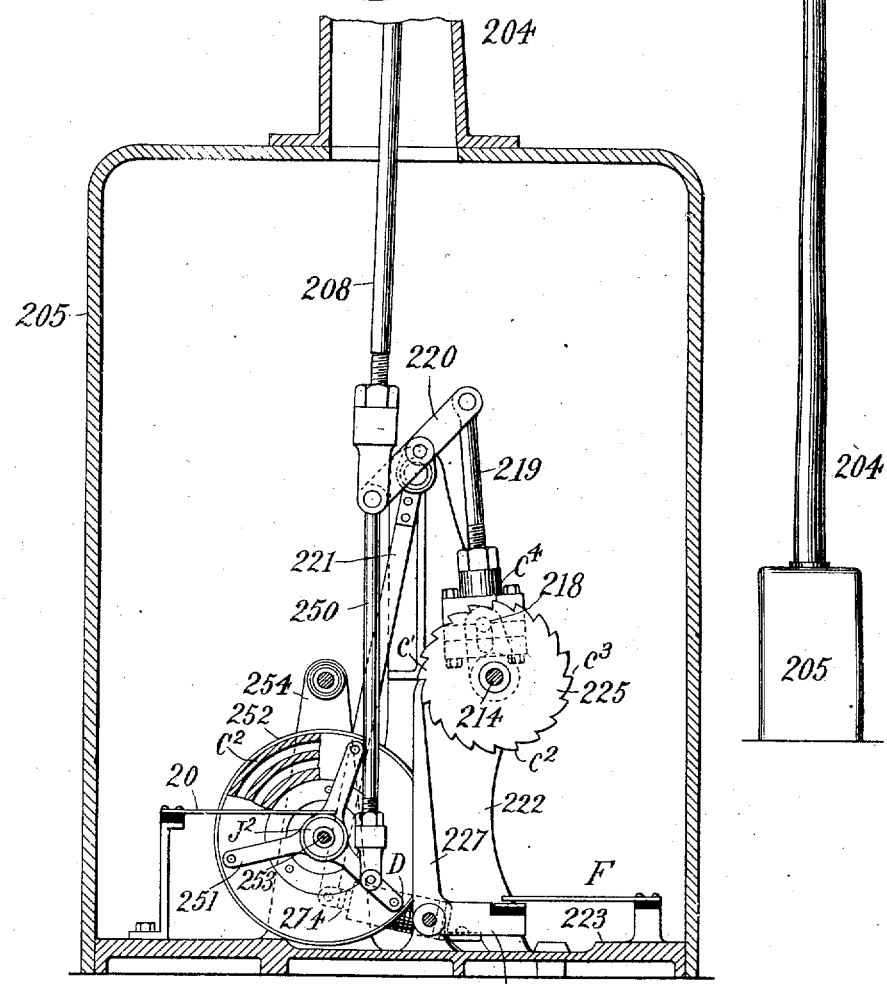

No. 754,363. PATENTED MAR. 8, 1904.
H. BEZER.
RAILWAY SIGNALING SYSTEM.
APPLICATION FILED FEB. 4, 1903.
NO MODEL. 9 SHEETS—SHEET 4.

Witnesses:
Livingston Kenney
J. H. Barnes

Inventor
Henry Bezer
by Henry D. Williams Atty

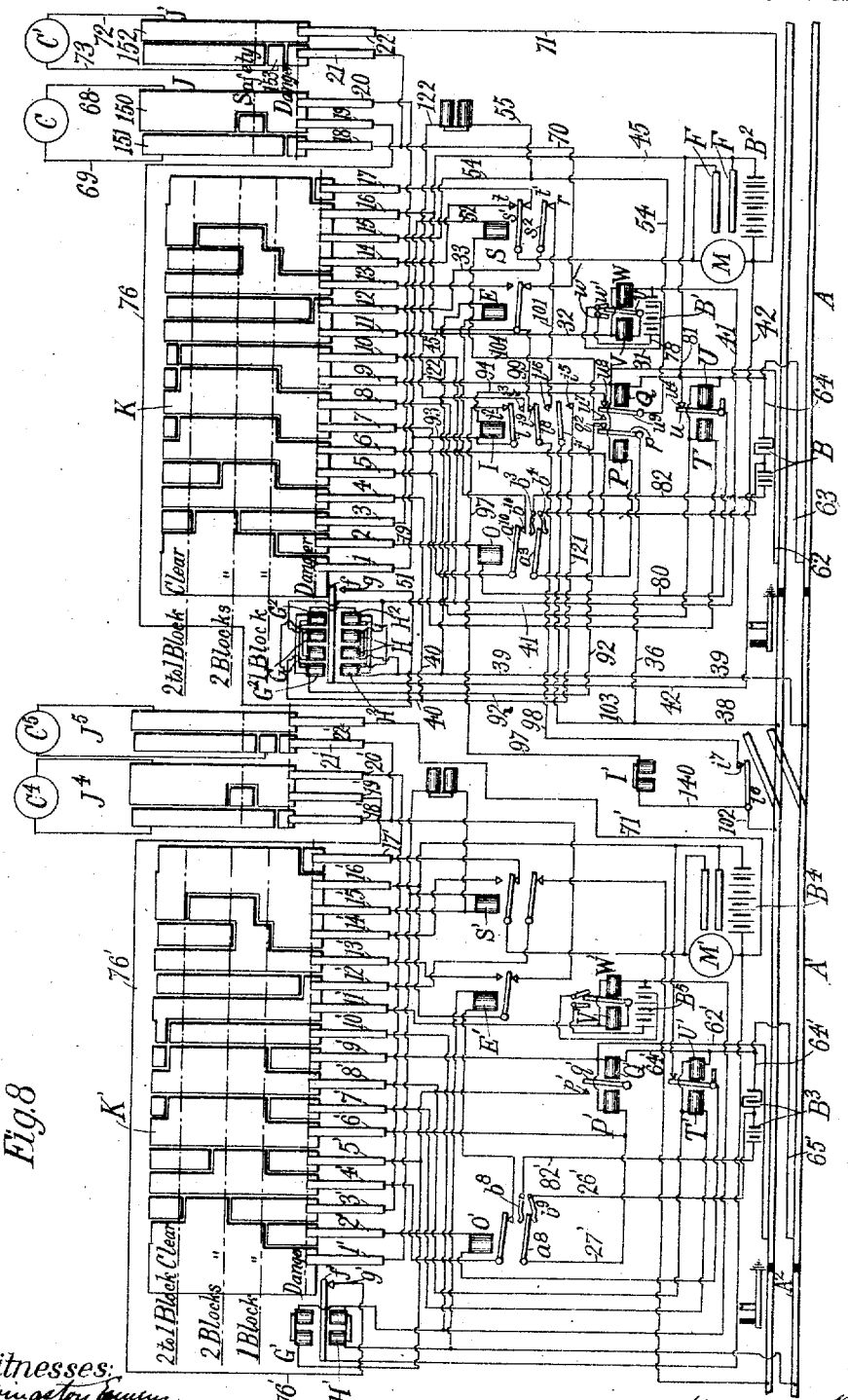

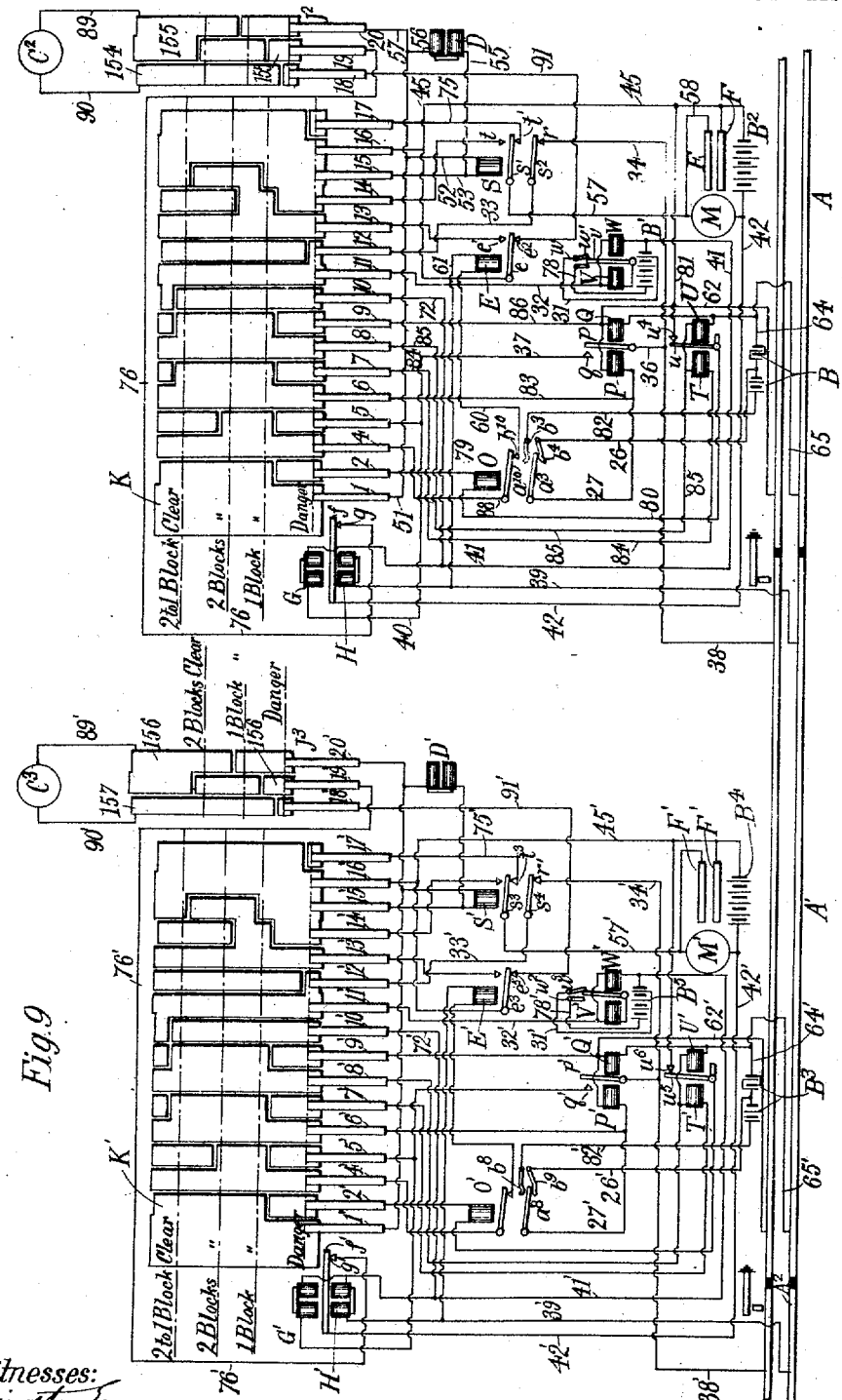

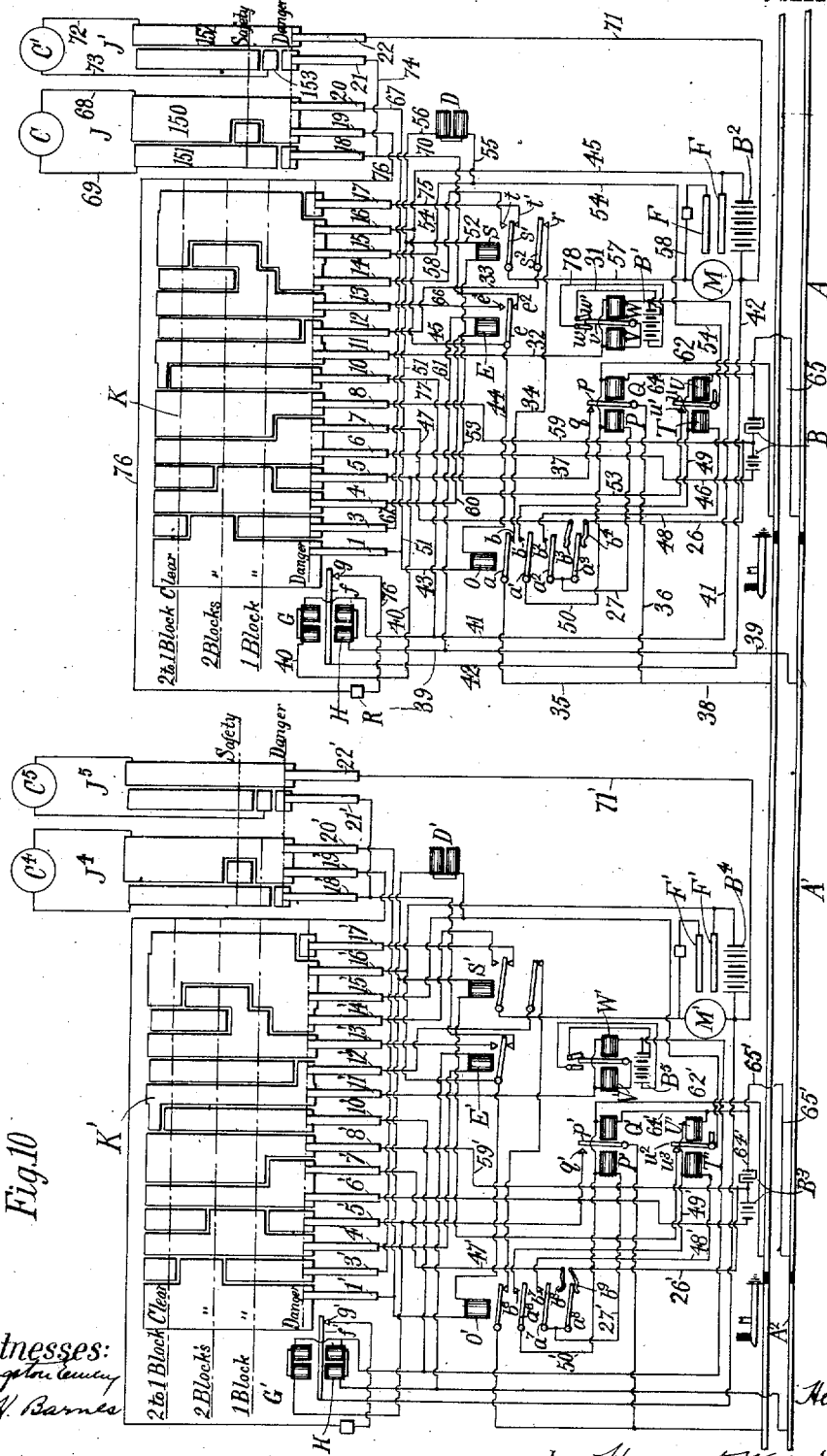

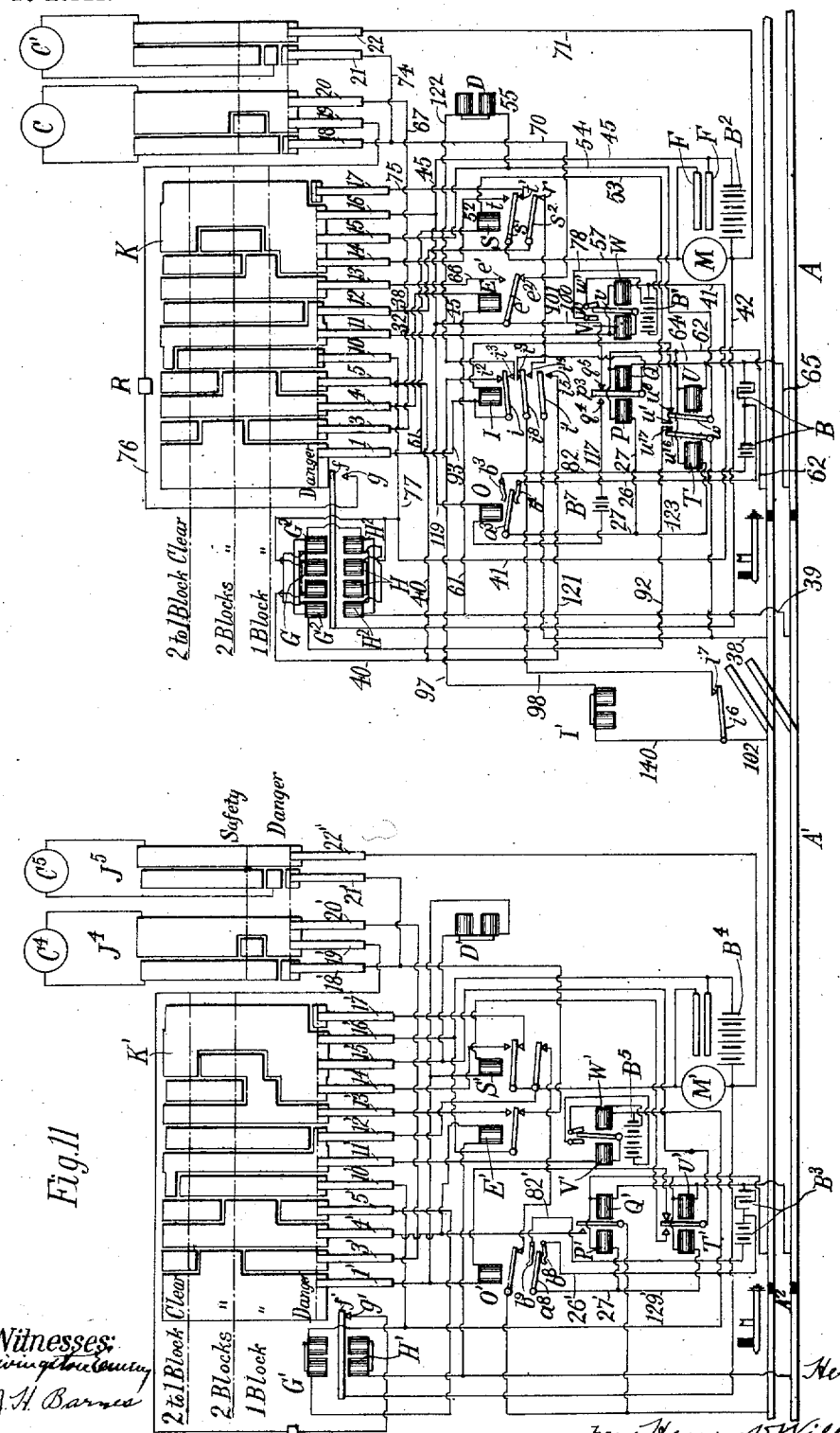

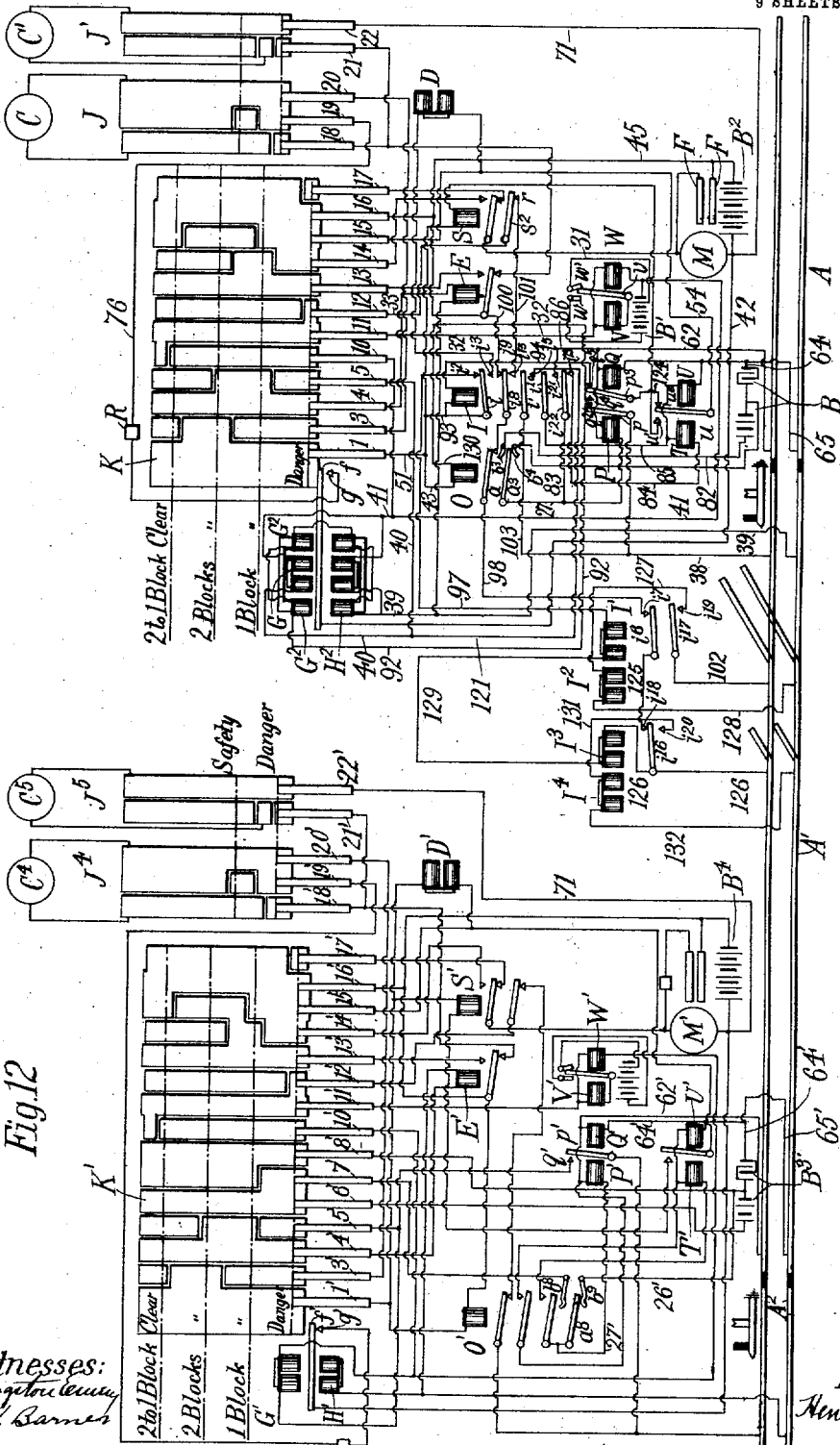

UNITED STATES PATENT OFFICE.

HENRY BEZER, OF WESTFIELD, NEW JERSEY.

RAILWAY SIGNALING SYSTEM.

SPECIFICATION forming part of Letters Patent No. 754,363, dated March 8, 1904.

Original application filed October 16, 1901, Serial No. 78,812. Divided and this application filed February 4, 1903. Serial No. 141,858. (No model.)

*To all whom it may concern:*

Be it known that I, HENRY BEZER, a subject of the King of Great Britain, residing at Westfield, in the county of Union and State of New Jersey, have invented certain new and useful Improvements in Railway Signaling Systems, of which the following is a specification, reference being had therein to the accompanying drawings.

My invention relates to railway signaling or traffic-controlling systems, and has for its principal objects certainty of operation, reliability of operation, and simplicity of construction.

My invention consists in the provision of means whereby wireless circuits, including the rails of the track as the only conductors from point to point along the line of railway, may effect home and distant signal indications, and, further, in the provisions of means whereby such circuits may effect such indications without polarized relays.

My invention further consists in the provision of a source of electric energy of given power in a circuit controlling a signal, and a source of electric energy of greater power and train-controlled means in rear of the signal for connecting the source of electric energy of greater power in such circuit, and, further, in train-controlled means in rear of the signal for connecting the source of greater power in the circuit, and train-controlled means in advance of the signal for disconnecting the source of greater power from the circuit, and, further, in means for effecting indications of one block clear and two blocks clear combined with such train-controlled means, and, further, in means for reducing the flow of current to the lesser power when the train passes the indicating means.

My invention further consists in the provision of two front relays, one normally in circuit and the other normally out of circuit, and means controlled by the approach of a train for putting the latter relay in circuit, and, further, in means whereby such control is effected through the front relay normally in circuit.

My invention further consists in the provision of a series of rail-circuits having normally deënergized rear relays, each of such relays being controlled by the presence of a train in the second block in rear to energize it, and, further, in the provision of means whereby with normally deënergized rear relays a signal two blocks in advance of a train must be in condition to go to "clear" before the signal immediately in advance of the train can give the two-blocks-clear indication, and, further, in the provision of a normally deënergized home-signal rear relay and a normally deënergized distant-signal rear relay and means whereby the former is energized by the presence of a train in the second block in rear and the latter is energized by the presence of a train in the block in rear.

My invention further consists in the provision of means for assuring the operation of electric translating devices at the front end of a block or section, and, further, in means for sending a more powerful current to the exposed conductors or rails at the rear end of the block or section for such purpose.

My invention further consists in the combination of a switch-controlling device and a signal, the block or section having no insulated joints at the switch and the signal having all-rail circuits, and, further, in the provision of means whereby with such rail-circuits for the signal the signal is prevented from giving a safety indication when the switch is open, and a safety operation of the switch-controlling means is prevented when the signal is in the safety condition, and, further, in the provision of a switch rear relay on normally closed circuit and means whereby the circuit thereof is opened on the approach of a train.

My invention further consists in means whereby the switch-controlling device is on a separate line-circuit from the switch to the signal.

My invention further consists in various improvements in circuits and apparatus and in details of construction of circuits and apparatus, as hereinafter fully described and claimed.

I will now particularly describe the circuits and apparatus illustrated in the accompanying drawings and embodying my invention and will thereafter point out my invention in claims.

Figure 2:
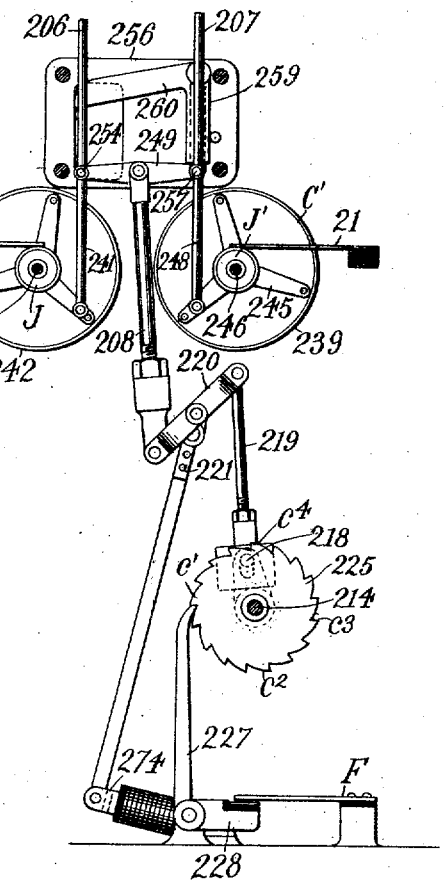
Figure 3:
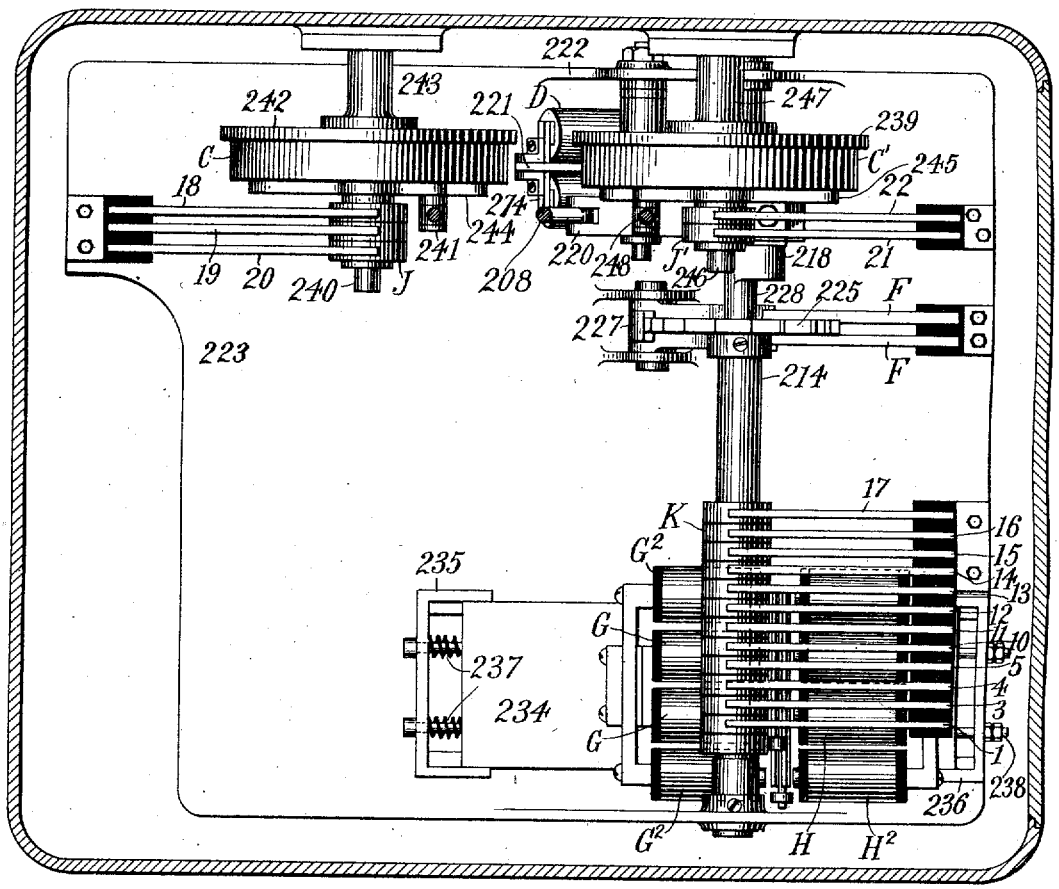
Figure 4:
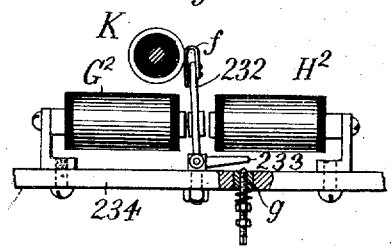
Figure 7:
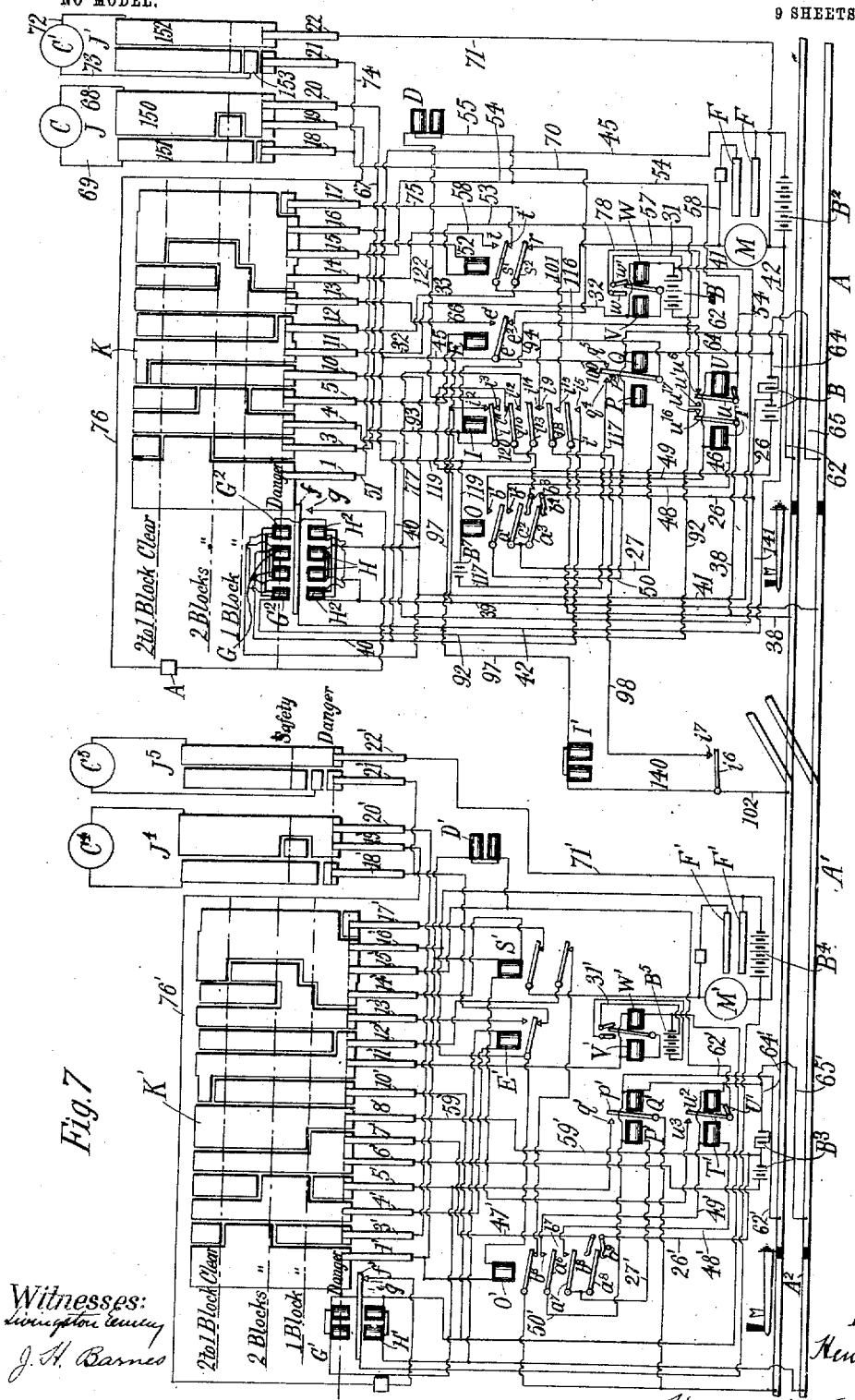

Figure 1 is a front elevation, partly in section, of a signal-post having two signal-semaphores—home and distant. Fig. 2 is a front elevation, on an enlarged scale, of a portion of the signal mechanism for such signals. Fig. 3 is a plan view of such signal mechanism. Fig. 4 is a detail elevation of the rear relay and vertical section of the main commutator. Fig. 5 is a front elevation of a signal-post containing a single three-position signal. Fig. 6 is an enlarged vertical section of portions of the same, showing the signal mechanism. Fig. 7 is a diagrammatic view illustrating the commutator, relays, and circuit connections at the rear ends of two adjacent blocks. Figs. 8, 9, 10, 11, and 12 are similar views of modified constructions.

I have shown in the drawings two constructions of signals adapted to be employed in connection with the circuit constructions and arrangements embodying my present invention. In the construction shown in Figs. 1 to 4, inclusive, the indicating means comprise two ordinary two-position semaphores 201 202, the semaphore 201 being the home signal and the semaphore 202 the distant signal. These signals are counterweighted to go to "danger" by spectacles, (not shown,) as well understood, and also by the weight of their up-and-down rods 206 and 207, respectively. In the construction shown in Figs. 5 and 6 a single three-position semaphore 203 is shown embodying the invention set forth and claimed in my Patent No. 602,792, issued April 19, 1898, this semaphore indicating "danger" by horizontal position, "one block clear" by oblique position, and "two blocks clear" by vertical position. This signal is counterweighted to go to "danger" by its own weight, its pivotal center being near the upper edge, and is also thus counterweighted by the weight of its up-and-down rod 208. The day-signal semaphores only are shown; but these semaphores would of course be properly combined with lanterns to give the night-signals. The semaphore or semaphores are carried on posts 204, extending upward from signal-boxes 205, within which are located the signal-actuating mechanisms. Sufficient only of this actuating mechanism is shown to enable the operation of the controlling-circuits to be understood. In both of these constructions the main shaft 214 has thereon the actuating crank and pin 218, on which is pivotally connected one end of the connecting-rod 219, the other end of which is pivotally connected to the cross-lever 220. The cross-lever 220 is also pivotally connected to the actuating-rod 208 and is medially fulcrumed upon the clutch-lever 221, and the clutch-lever has a stationary pivotal point in proximity to the point where the cross-lever 220 is pivoted thereon and carries at its lower end the armature 224 of the clutch-electromagnet D.

A locking ratchet-wheel 225 is provided on the main shaft 214 and coacts with a lock-pawl 227, which locks the shaft against rearward movement, and this pawl is held against the ratchet-wheel by a counterweighting foot-piece 228, this foot-piece having an insulated upper plate of conductive material arranged to come in contact with and electrically connect the flexible contacts F F as the pawl is lifted by the ratchet-teeth.

The main commutator K is secured upon the main shaft 214 and is provided with a number of plates which act in various positions of the commutator to electrically connect different brushes thereof. A number of fixed brushes is provided (designated 1 to 17, inclusive) in the several different constructions of commutator illustrated in Figs. 7 to 12, inclusive, but not all appearing in any one view, and twelve being provided in the construction shown in Figs. 1 to 4, inclusive, which corresponds to that shown in Fig. 7. A movable brush $f$ is also provided, this brush appearing in all constructions, and the movable brush $f$ is carried by the armature-lever 232 of an electric translating device or compound rear relay. In the construction shown in Figs. 1 to 4, inclusive, and Fig. 7 this electric translating device comprises four pairs of opposed coils, the two pairs of opposed coils G and H constituting the home-signal rear relay and the two pairs of opposed coils $G^2$ and $H^2$ constituting the switch rear relay, these relays being symmetrically disposed, the four coils of the relay G H being in the middle and two coils of the relay $G^2 H^2$ at each end, thereby preventing twisting strains to the common armature from the separate actions of the relays. In the construction shown in Figs. 5 and 6 this electric translating device is composed only of the two pairs of opposed coils G and H, constituting the home-signal rear relay. The main commutator K and commutator-brushes of the construction shown in Figs. 5 and 6 correspond with those shown in Fig. 9.

The armature-lever 232 is shown as provided with a counterweight or tailpiece 233, which tends to move it backward away from the front coils G $G^2$ or G of the rear relay, and the adjustment of the backward position of the armature-lever is effected by an adjustable back screw-contact $g$, shown as threaded in a plug fixed in the base 234, which base should be of insulating material, as stone, and the screw-contact $g$ is shown as provided with a spring to prevent loosening thereof. The adjustment of the extreme front position of the armature-lever is provided by adjustment of the relay and base as a whole, the base 234 being supported on ledges formed in uprights 235 236, the front upright 235 having guiding-pins and springs 237 and the rear upright 236 having adjusting-screws 238 with jam-nuts thereon. The movable commutator-brush $f$ is shown as a looped spring, the free leg of which comes against the surface of the commutator, and, as usual, a non-magnetic stop-pin will prevent contact of the armature with the poles of the front coils, and the adjustment will be such that the movable brush $f$ will exert a slight spring-pressure against the commutator when in forward position.

For the purpose of cushioning the movements of the signals in their return to danger position under the action of their counterweights I provide electromagnetic brake-clutches. In the construction employing two signals, Figs. 1 to 4, inclusive, each signal has an independent brake-clutch, the home signal 201 having the brake-clutch annular electromagnet C carried on a spider 244, the spider being fitted to rotate on a stud 240, carried on a bracket 243, secured to the signal-box 205. The spider 244 has a connecting-rod 241, whereby it is connected to the home-signal up-and-down rod 206 at the joint of the same with the cross-link 249, which cross-link connects the two up-and-down rods. A fixed disk armature 242 is provided for this annular clutch-magnet C. This annular clutch-magnet is of the type known as "iron-clad" electromagnets and need not be particularly described. This home-signal brake-clutch C also performs the function of a holding-clutch under conditions such that the distant signal is returned to "danger" and the home signal maintained at "safety," as will appear from the description of the circuits.

The distant-signal brake-clutch electromagnet C' and spider 245, mounted to rotate on the stud 246 of bracket 247 and having a connecting-rod 248 connected to the distant-signal up-and-down rod 207 at the joint of the same with the cross-link 249, and also the fixed disk armature 239 of this magnet are of the same construction as the parts just described of the home-signal clutch.

The three-position signal of the construction shown in Figs. 5 and 6 has but one up-and-down rod, which is the actuating-rod 208, and a single brake-clutch, and the connecting-rod 250 of this brake-clutch is joined to the actuating up-and-down rod 208 at its joint with the cross-lever 220. The clutch-electromagnet $C^2$ is located lower down, near the base-plate, and is of the same annular or iron-clad construction as the other brake-clutches just described and is carried by a spider 251, secured upon a spindle 253, fitted to rotate in bearing-standards 254 and 255, and the disk armature 252 is fixed to the rear standard 254. This brake-clutch $C^2$ also acts a retarding-clutch during the whole movement from two to one blocks clear, as will be hereinafter described.

Each of the brake-clutches carries a commutator insulated from and secured to the spider, the home brake-clutch C having the commutator J with brushes 18, 19, and 20, the distant brake-clutch C' having the commutator J' with brushes 21 and 22, and the home and distant or three-position brake-clutch $C^2$ having the commutator $J^2$ with brushes 18, 19, and 20.

In the construction shown in Figs. 1 to 4, inclusive, employing two signals—a home and a distant signal—connecting and selecting mechanism is provided whereby the actuating-rod 208 imparts the necessary movements to the separate up-and-down rods of the two signals and whereby these movements are controlled. The cross-link 249, above referred to, is pivotally connected at each end to one of the up-and-down rods and pivotally medially connected to the actuating-rod 208. The home-signal rod pivot-pin 254 is provided with friction-rollers working against guide-surfaces in fixed guide-plates 256. The distant-signal rod pivot-pin 257 has friction-rollers working in vertical grooves in such guide-plates. A pivoted latch-lever has a depending locking-arm 259 to lock the distant signal during the movement of the home signal to "safety," and an actuating-arm 260, which unlocks the locking-arm at the completion of the movement of the home signal to "safety."

The signals are normally in the horizontal or danger position. The normal position of the controlling mechanism is shown in Fig. 2. The holding-clutch electromagnet D is deënergized, but the clutch-armature 274 is held against the poles of this magnet. The first step in the operation of the signals is the closing of the circuit through the coils of the holding-clutch electromagnet, and this is followed by the actuation of the main shaft 214 by the motor, and to put the home signal to "safety" the main shaft will be rotated through approximately one-quarter of a revolution. The completion of the movement of the home-signal up-and-down rod 206 will actuate the latch-lever 259 260 and unlock the distant-signal up-and-down rod 207. If the conditions of traffic permit the distant signal also to be put to "safety" the actuation of the main shaft will be continued through approximately another quarter-revolution.

Should the second block in advance become occupied by a train after both signals have been put to "safety" I have provided for returning the distant signal to "danger" and leaving the home signal at "safety." Under such conditions the holding-clutch D will be deënergized and simultaneously the home-signal clutch C energized more powerfully than for a brake-clutch, so as to become a holding-clutch and to hold the home signal at "safety." The distant signal will, however, be free to go to "danger," its movement being checked as it approaches the danger position by its brake-clutch C'. The motor will also be actuated and by forward rotation of the main shaft through approximately one-quarter of a revolution will force the distant signal to "danger" should its counterweight fail to put it to "danger." At the completion of the movement of the distant signal to "danger" and the movement of the main shaft 214, the said one-quarter of a revolution, the holding-clutch D will be energized and the home-signal clutch C deënergized, and the upward thrust on the connecting-rod 219 resulting from the actuation of the motor will have assured that the clutch-armature 224 will be against the poles of the clutch-electromagnet D at the completion of the movement, so that the holding-clutch D will be effective to hold both signals in the position which they have now assumed, the home signal at "safety" and the distant signal at "danger."

The signals will be free to return to "danger" under the action of their counterweights from the several positions of safety indication above described upon the deënergization of the holding-clutch D, and their movement will be retarded as they approach "danger" by their respective brake-clutches C and C'. I also provide, however, that simultaneously with the deënergization of the holding-clutch D the motor will be energized and will cause a forward rotation of the main shaft to normal position so as to force the signals to "danger" should the counterweights fail to act, and the final upward movement of the crank-pin 218 will force the clutch-lever 221 to normal position.

In the construction shown in Figs. 5 and 6, in which a single three-position signal 203 is employed, the actuating-rod 208, which in this construction is also the up-and-down rod of the signal, is shown as connected to the signal-spindle 197 by a bell-crank 199 and connecting-rod 198. The actuating-rod 208 is actuated in the same manner to put the signal to the oblique or one-block-clear or home safety position and to the vertical or two-blocks-clear or distant safety position, as heretofore described relative to the two-signal construction. In the movement from two to one block clear, equivalent to putting the distant signal to "danger" and leaving the home signal at "clear," the holding-clutch magnet D is deënergized, as in the corresponding movement in the two-signal construction; but simultaneously the single brake-clutch C² is energized, so as to retard the movement of the signal, and the motor is energized, and the clutch remains energized during the entire movement, thereby compelling the motor to move the signal against the resistance of the brake-clutch C² and causing the crank-pin 218 of the actuating-shaft to exert an upward pressure against a resistance to downward movement of the actuating-rod throughout the entire movement, which resistance will hold the holding-clutch armature 224 against its magnet D, so that at the conclusion of the movement, when the holding-clutch magnet is again energized, the signal will be held thereby in the one-block-clear position.

In the drawings illustrating the circuits, Figs. 7 to 12, inclusive, the rails of the track are represented in plan, and in each view the rails of one block A' and at the advance end of the block A in rear thereof and at the rear end of the block A² in advance thereof are represented. For convenience in description I shall refer to the rail which is the upper rail in these plan views as the "upper" rail and the rail which is the lower one in these views as the "lower" rail. In Figs. 7, 8, and 11 the block A' is provided with one siding and in Fig. 12 with two sidings, and the switches are represented conventionally, as are also the contacts controlled by the switches and the coils of the switch-controlling devices. In these diagrammatic drawings the several commutators are shown in development, the outlines of the several conductive plates and the separating spaces being shown. It will of course be understood that these conductive plates are secured upon sleeves of insulating material, so as to be electrically insulated from each other.

In addition to the rear or track relays shown in Figs. 3 and 4 I provide other relays, as two front relays P Q and T U, each having opposed coils and an armature between the opposed coils and which are hereinafter collectively referred to as "front" translating means, and also compound relays V W, having opposed coils and an armature between the opposed coils and distant-signal rear relays E and switch-controlling relays I and other controlling-relays O and S. The several relays are in many constructions provided with a plurality of movable fingers insulated from each other and all actuated by the armatures of the relays, and these fingers are conventionally represented in proximity to their controlling-coils, but sufficiently separated for clear illustration. The movable commutator-brush $f$ is also represented diagrammatically as contacting with the edge of its commutator-plate, this slight distortion being necessary for clear illustration of the circuit connections.

I will first describe the construction and arrangement of circuits and apparatus illustrated in Fig. 10, as this drawing illustrates a simple construction embodying several features of my invention. In this construction I provide two front relays for each block, which is in rear of another block. For the block A, shown as the first block to the right, one of these front relays has opposed electromagnets P Q and the other has opposed electromagnets T U, the relay having the opposed electromagnets P Q being operated by the presence of a train in the block in rear of the block A and both these front relays being operated by the presence of a train in the block A. I therefore designate the relay having the opposed electromagnets P Q as the "home"

and "rear" blocks front relay and the relay having the opposed electromagnets T U as the "home-block" front relay. For the block A' in advance of the block A a corresponding home and rear blocks front relay P' Q' and a corresponding home-block front relay T' U' are provided, and I will first describe the normal track-circuits of the block A', as this description will equally apply to the track-circuits of all other blocks except the front end block of a system, wherein no front relays would be required. The coils of the opposed electromagnets P' Q' of the home and rear blocks front relay are in a normally closed circuit from a part of the track-battery $B^3$, this track-battery being shown as having two of its cells connected in multiple in such circuit, so that the current flows from the two cells in multiple through wire 26', flexible contact $b^9$, armature-finger $a^8$, wire 27', through coils P', and from coils P' in two paths, one through the coils Q' and wire 64' back to battery and the other through the wire 62' to the upper rail and from rail to rail through a circuit of variable resistance comprising the ground and the ties and from the lower rail by wires 65' 64' back to battery. It will be noted, however, that the rails of the block are bridged at the rear end of the block by metallic conductors extending from a battery B', located at the rear end of the block, and which will be termed the "opposing" battery, through which the current may be assumed to flow, as follows: from one cell of the opposing battery B' by wire 31, contacts $w'$ $v$, front coils V of a compound relay V W, and from the coils V in two paths, one through the back coils W and back to battery and the other by wire 32, brushes 11 12, wire 33, contacts $s^2 r$, wire 34, contacts $b$ $a$, wires 35 38, to upper rail, and from lower rail by wire 39, coils H, wire 41, back to battery. As the path of the track-battery $B^3$ through these conductors is in opposition to the polarity of the opposing battery B', the flow of current from battery B' will normally be substantially through the grounded conductors of variable resistance formed by the ties and the flow of current from the track-battery $B^3$ will also normally be substantially through such grounded conductors.

The coils Q' are of high resistance and the coils P' of low resistance, and the current normally flowing through these circuits will retain the armature-lever $p'$ in rearward position. The armature will be attracted toward the front coils P' by the presence of a train in the block A, which will cause the coils of the home-signal rear relay G H and of the distant-signal rear relay E to be connected in multiple and with the rails at the rear end of the block A'.

The coils of the home-block front relay T' U' are normally deënergized, and the armature-lever $U^2$ of this relay is normally held by gravity in rearward position, a foot-piece being shown as provided for such purpose, and the home-block front relay is energized by the actuation of the corresponding home and rear blocks front relay P' Q', resulting from the approach of a train.

I will now describe the operation, assuming, first, that a train has entered the block in rear of the block A. The entrance of a train in this block will cause the coils of a home-signal rear relay at the rear end of the block A, (not shown,) corresponding to the home-signal rear relay G H, and the coils of a distant-signal rear relay (not shown) at the rear end of the block A, corresponding to the distant-signal rear relay E, to be connected in multiple and with the rails at the rear end of the block A, as will appear from a description hereinafter given of a similar operation of the corresponding circuits at the rear end of the block A'. This operation will cause the armature-lever $p$ of the home and rear blocks front relay P Q to close upon the contact $q$ and, providing there is no train in the block A', will cause the normally open circuit which actuates the home-block front relay T U to be closed in the manner hereinafter described, but will not cause the front coils of the home-block front relay T U to attract the armature $u$ of that relay, since the circuit of this relay will be closed through a circuit including the two relays already mentioned at the rear end of the block A, corresponding to the home-signal rear relay G H and the distant-signal rear relay E in multiple, and the resistance of this circuit will prevent attraction of the armature $u$. This circuit when the coils of the home-signal rear relay and distant-signal rear relay at the rear end of the block A are connected in multiple and connected to the rails at the rear end of the block A before the said introduction of the home-block front-relay coils T U into such circuit is as follows: from two cells in multiple of the battery B by wire 26, contacts $b^4$ $a^3$, wire 27, front coils P, and from the front coils P through the back coils Q back to battery and also from the front coils P by wire 62 to the upper rail of the block A and through the ties and ground to some extent to the lower rail, and by wire 65 back to battery, and from the upper rail through contacts at the rear end of the block A, corresponding to the contacts $p$ $q$, and in series through the home-signal rear-relay coils at the rear end of the block A, (corresponding to the home-signal rear-relay coils G H at the rear end of the block A',) and through the distant-signal rear relay (corresponding to E at the rear end of the block A') in parallel with the said home-signal rear-relay coils, (which are in series with each other,) the said distant-signal rear relay being thus placed in shunt with the home-signal rear-relay coils at the rear end of the block A through a circuit corresponding to the following circuit at the rear end of the block A', (assuming the brushes 4 and 5 to bear upon the commutator K on the line marked "1 block clear:") from one terminal of the rear relay G H through wire 40, brush 5, the commutator, brush 4, wire 60, relay E, wire 61, and wire 39 to the opposite terminal of the rear relay. The opposing battery at the rear end of the block A corresponding to the opposing battery B' will not be in this circuit, because the contacts corresponding to $a\,b$ will be open. The joint resistance of all the branches of the foregoing circuit which are included between the rails of the block A' and in shunt with the back coils is such that the attraction of the front coils P will preponderate over that of the back coils Q, the armature-lever $p$ will be caused to close on its front contact $q$, and the front and back coils T and U of the home-block front relay will be introduced into the foregoing circuit and in parallel, respectively, with the front and back coils P Q, as will be hereinafter more fully explained. The armature $u$ of the home-block front relay, however, will not be attracted toward its front coil T until the attraction of its back coil U is reduced by a still further reduction in the resistance of that portion of the circuit comprised between the rails of the block A and in parallel with the back coils U and Q. The closing of the contacts $p\,q$ of the home and rear blocks front relay closes a circuit from a part shown as one cell of the opposing battery B' and through the front coils G of the home-signal rear relay of the block A', and thereby causes the movable brush $f$ to come in contact with the commutator K. This circuit is as follows: from one cell of the opposing battery B', by wire 31, flexible contact $w'$, armature-lever $v$, and front coils V of the compound relay V W, wire 32, brushes 11 and 12, wire 33, contacts $s^2\,r$, wire 34, contacts $b\,a$, wires 35 36, contacts $p\,q$, wires 37 40, front coils G, and wire 41 back to battery. It will be observed that the circuit just described has a path branching from the junction of the wires 35 and 36, by the wire 38 to the upper rail, through the upper rail to the front end of the block, through the wire 62', coils P, wire 27', contacts $a^8\,b^9$, wire 26', two cells in multiple of the track-battery B³ at the front end of the block A' in opposition to the polarity thereof, and by wires 64' 65' to the lower rail and through the ties and ground to some extent from the upper rail to the lower rail and also through the coils Q' and wires 64' 65' to the lower rail, all of these connections being in multiple, and from the lower rail by wire 39 and back coils H to the wire 41, wherein it meets the other path above described and proceeds back to battery. If the block A' were clear of trains, the joint resistance of these last-described circuits would be such that a more powerful current would flow through the front coils G than through the back coils H, and the movable brush $f$ would be moved into contact with the commutator K. If, however, a train were in the block A', the circuit last described through the back coils H would have its resistance greatly diminished by the train, which would connect the rails of the track A' by its wheels and axles, forming a path of low resistance from the upper rail to the lower rail and cutting out the joint resistance and counter or opposed electromotive force of the coils P' and the battery B³ in series with each other and of the coils Q' in parallel therewith, the current for the back coils H then flowing as follows: from one cell of the opposing battery B', through wires 31, contacts $w'\,v$, coils V, wire 32, brushes 11 22, wire 33, contacts $s^2\,r$, wire 34, contacts $b\,a$, wires 35 38, upper rail, wheels and axles of train, lower rail, wire 39, back coils H, and wire 41 back to battery. This circuit in multiple with that through the front coils G, above described, will hold back the movable brush $f$ and prevent its contact with the commutator. The presence of a train in the block A' will also shunt the current of the track-battery B³ and prevent any possibility of the actuation of the rear relay by this track-battery.

If there is no train in the block A', and therefore the movable brush $f$ is brought into contact with the commutator K, the movable brush will close a circuit from the main battery B² through wire 42, movable brush $f$, and fixed brush 1, wire 43, coils of relay O, and wires 44 45 back to battery. The circuit thus closed actuates the armature of relay O and opens at the contacts $a\,b$ the circuit above described, whereby the opposing battery B' placed the movable brush $f$ in contact with the commutator; but the movable brush will be maintained against the commutator by current flowing from the two cells in multiple of the track-battery B³ at the front end of the block A' by wire 26', contacts $b^9\,a^8$, wire 27', coils P', wire 62', upper rail, wires 38 36, contacts $p\,q$, wires 37 40, front coils G and back coils H in series, wire 39, lower rail, wires 65' 64' back to battery. The maintenance of the movable brush $f$ against the commutator by the current from the advance track-battery B³ puts the signal-controlling means of the home signal at the rear end of the block A' in the safety condition.

The energization of the coils of the relay O will also effect the closing of contacts $a^3\,b^3$ and $a^2\,b^2$ and $a'\,b'$, and the front and back coils T U of the home-block front relay will be connected in multiple, respectively, with the front and back coils P and Q of the home and rear blocks front relay while both back coils are then in shunt or parallel with the portions of the circuit from rail to rail of the block A, the circuit including the whole of the track-battery B by wire 46, brushes 6 7, wire 47, contacts $b^3\,a^3$ and $a^2\,b^2$, wire 48, coils T and U in series, and wire 64 back to battery, and from coils T by wire 49, contacts $b'$ $a'$ by wire 50 to the wire-connecting coils P and Q in series, and thence by wire 62 to upper rail, and, as already described, through these circuits from rail to rail comprising the joint resistance of relays at the rear end of the block A corresponding with the home-signal rear relay G H and the distant-signal rear relay E, and from lower rail by wires 65 64 back to battery. The coils of the home and rear blocks front relay P Q are now in multiple with the coils T and U in this same circuit, having the full power of the battery B, being comprised in a branch leading from between the contacts $a^2$ $a^3$ through wire 27 and coils P and Q in series and by wire 64 back to battery, the aforedescribed track-circuit or circuits being in parallel with the back coils Q. Although the coils of the home-block front relay T U are now in multiple with the coils of the home and rear blocks front relay P Q, the armature of the home-block front relay is not attracted, because of the resistance in the track-circuit already described from rail to rail of the block A through the relays at its rear end, which circuit is in parallel with the rear coils of both relays P Q and T U, and such armature will not be attracted until the train enters the block A, thus greatly reducing the resistance of this shunt-circuit, (by introducing a short circuit from rail to rail,) so as to effectually reduce the current in the rear coils of the relays.

This operation of the relay O, resulting in the connection of both front relays with full battery-power, has put the full battery-power of the track-battery B onto the track-circuit through the rails of block A, this full battery-power being necessary to clear the distant signal at the rear end of the block A. From the above description it will be evident that this could not have been done if there was a train in the block A', and therefore that the conditions in the block A' must be such as to permit the home signal at the rear end of that block to go to "safety" to indicate one block clear in order that the distant signal at the rear end of the block A may go to "safety" and thereby indicate two blocks clear, and this control is exerted through the controlling means whereby the home signal at the rear end of the block A' would be put to "safety," so that the home signal at the rear end of block A' must be in condition to go to "safety" before the distant signal at the rear end of block A can go to "safety" and indicate that the block A' is clear of trains.

When the train enters the block A, it will close a shunt across the rails which will cut out the joint resistance of coils at the rear end of the block A corresponding with the home-signal rear-relay coils G H and the distant-signal rear relay E, and this short circuit of low resistance across the rails will cause the attraction of the front coils T of the home-block front relay to preponderate, and the armature-lever $u$ of this relay will be moved against the contact $u'$, the armature-lever $p$ of the other front relay still remaining against the contact $q$. The closing of the contacts $u$ $u'$ will close an actuating-circuit for the signal at the rear end of the block A' through the coils of relay S. The movable brush $f$ is already against the commutator, as before described, there being no train in the block A' to shunt the advance track-battery $B^3$. The circuits now to be described are dependent upon the maintenance of the movable brush $f$ against the commutator and would be opened should a train back into or otherwise enter the block A'. The holding-clutch circuit is as follows: from main battery $B^2$ by wire 42, movable brush $f$, fixed brush 1, wires 51 56, clutch-coils D, wires 55 54, brushes 15 16, and wire 45 back to battery. The home-signal circuit closed at the contacts $u$ $u'$ is as follows: from main battery $B^2$ by wire 42, movable brush $f$, fixed brush 1, wires 51 52, coils S, wire 53, contacts $u'$ $u$, wire 54, brushes 15 16, and wire 45 back to battery. The energization of the coils S closes a motor-actuating circuit for putting the home signal to "safety" by closing the contacts $s'$ $t$. The motor-actuating circuit is as follows: from main battery $B^2$ directly to the motor M, wire 57, contacts $s'$ $t$, wire 58, brushes 14 16, and wire 45 back to battery. The motor and holding-clutch will now be energized and the home signal will be moved to the safety position, the commutator advancing so that the brushes rest upon the dotted line marked "1 block clear." As commutator K approaches this position and before the break in the commutator-plate of the brush 14 passes thereunder the pawl 227 is lifted by the tooth $c^2$ of the ratchet-wheel 225, and thereby the foot-piece 228 of the pawl will come in contact with the brushes F F and complete the following motor-circuit: from battery $B^2$ through the motor M, wire 58, brushes F F, and wire 45 back to battery. This construction obviates any dependence upon momentum to carry the break in the commutator-plate past the brush 14, and the motor-circuit is continued until the tooth $c^2$ passes clear of the pawl 227 and the pawl drops behind the tooth. This movement of the pawl opens the motor-circuit just described, which was closed by the pawl, and the motor-circuit through the brush 14 is already open at the break in the commutator-plate, and should there be a train in the block $A^2$, so that the distant signal will not be put to safety position, the actuation of the signal mechanism will terminate at this point. It will be observed that the opening of the motor-circuit occurs at the brushes F F, and any sparking incident thereto occurs at these brushes, and as these brushes are not required to again close a circuit until they have been subjected to a rubbing action, resulting from the actuation of the pawl by several teeth of the ratchet-wheel, any fouling from the effects of sparking will be removed. The commutator-brushes are now upon the line marked "1 block clear." In consequence of this movement the circuit above described, which was closed through the brushes 6 7, whereby the two front relays were connected in multiple with the full power of the track-battery B, is now opened between the brushes 6 and 7; but a circuit through these two front relays from the two cells in multiple of the track-battery B is closed through the brushes 8 7, as follows: from the two cells in multiple of the battery B through wire 59, brushes 8 7, wire 47, and contacts $b^3$ $a^3$, and through the two front relays in multiple, as before described. The brush 7 extends across or bridges the break or opening between the commutator-plates, so that the maintenance of a circuit through the front relays is continuous, thereby continuing in closed condition the circuits maintained through and by the contacts $p$ $q$ and $u$ $u'$, and therefore continuing the energization of the holding-clutch coils D, and thereby holding the home signal at "safety." Thus the entrance of the train upon the block A effects a change from the connection of the full battery-power of the track-battery B to the connection of the two cells in multiple thereof to the rails, thereby preventing too great an increase of battery-current, which might otherwise arise from the reduction in resistance of the track-circuit of the block A, due to entrance of the train therein, the wheels and axles of which form a connection of negligible resistance between the rails. Such undue increase in current is prevented, however, by this reduction of battery-power at a time when the train is still in or near the rear end of the block A and while the greater portion of the lengths of the rails thereof is still included in the track-circuit to prevent its resistance from falling unduly. With the commutator in this position, the brushes being at the line marked "1 block clear," a connection will be closed between the brushes 4 and 5, whereby the coils of the distant-signal rear relay E and the coils of the home-signal rear relay G H will be connected in multiple with each other, while being connected between the rails of the block A' in a circuit leading from the front end of that block, the portion of this circuit from rail to rail at the rear end of the block being as follows: from upper rail by wires 38 36, contacts $p$ $q$, and wire 37, and branching from the wire 37 in one path through brush 5 and in the other path through the wire 40, the circuit through the path first mentioned proceeding from brush 5 to brush 4 and by wire 60 to coils of relay E and by wire 61 to wire 39, and the circuit through the other path being from wire 40 through the coils of rear relay G H in series to wire 39 and these branches uniting at wire 39 and proceeding therethrough to the lower rail of the block A'.

The portion of the above particularly-described circuit which leads from rail to rail at the front end of the block A' corresponds to that already described from rail to rail at the front end of the block A when the train first entered the second block in rear thereof. It comprises two parallel branches, the first branch leading from the lower rail through the wires 65' and 64', the two multiple cells of the battery $B^3$, the wire 26', contacts $b^9$ $a^8$, wire 27', front coils P' of the home and rear blocks front relay P' Q', and wire 62' back to the upper rail, and the second branch leading from the lower rail through wire 65', wire 64', rear coils Q' of the same relay and wire 62' back to the upper rail. With the relay E thus added to the track-circuit of the block A' and in multiple with the coils G H the joint resistance of this track-circuit (which, as already noted, is in parallel with the back coils Q' with respect to the circuit of the track-battery $B^3$) is so reduced that the coils P' of the front relay P' Q' attract the armature $p'$, and thereby close a circuit, such as before described with reference to the station at the forward end of the block A, which will put the movable commutator-brush $f'$ against its commutator K', providing there is no train in the block $A^2$, and will thereby close a circuit of the coils O', corresponding to that already described for the coils O, and thereby connect both front relays of the block A' in multiple with each other in the circuit of the battery $B^3$ and at the same time raise this battery to its full power, and this full battery-power will be applied to the rails of block A' and will flow through the coils of the home-signal rear relay G H and of the distant-signal rear relay E, and the relay E will then be energized sufficiently to attract its armature, thereby closing the contacts $e$ $e'$. The closing of the contacts $e$ $e'$ will complete the following circuit for the motor: from main battery $B^2$, through motor M, wire 57, contacts $s'$ $t$, wire 58, brushes 14 13, wire 66, contacts $e'$ $e$, wire 45, back to battery. The circuit for the holding-clutch D still remains closed, as it is maintained through the movable brush $f$ and fixed brush 1, as before described, and the signal is therefore moved toward the two-blocks-clear position. As the longitudinal brake in the commutator-plate of the brush 15 passes under the brush 15 circuits are set up for the relay-coils S and the clutch-coils D through the brushes 15 and 13, replacing those which flowed through the brushes 15 and 16, the brush 15 extending across or bridging the break in the commutator-plate, so that the flow of current to the relay-coils S and to the clutch-coils D is continuous. These circuits are as follows: for the relay-coils S, from main battery $B^2$ by wire 42, movable brush $f$, fixed brush 1, wires 51 52, coils S, wire 53, contacts $u'$ $u$, wire 54, brushes 15 13, wire 66, contacts $e'$ $e$, wire 45, back to battery, and for the clutch-coils D from battery $B^2$ through wire 42, brushes $f$ and 1, wires 51 56, clutch-coils D, wires 55 54, brushes 15 13, wire 66, contacts $e'$ $e$, wire 45, back to battery. As the signal approaches the position of two blocks clear the break in the commutator-plate of brush 14 passes under this brush; but before this break passes under the brush the pawl 227 is lifted by the tooth $c^3$ of the ratchet-wheel 225, and thereby the foot-piece 228 of the pawl will come in contact with the brushes F F and complete a motor-circuit, as above described, and this motor-circuit will be continued until the tooth $c^3$ passes clear of the pawl and the pawl drops against the bottom of the tooth. This movement of the pawl opens the motor-circuit, and the commutator comes to rest with the brushes on the line marked "2 blocks clear" and the distant signal in the safety position, indicating two blocks clear, the coils S and the holding-clutch coils D still remaining energized and the holding-clutch therefore maintaining the signals in this position.

Should the block $A^2$ become occupied by a train after the distant signal has given the two-blocks-clear indication to the train in the block A and before the last-mentioned train passes out of block A, the train in the block $A^2$ will shunt the rail-circuit of the home-signal rear relay G' H', and the movable brush $f'$ will fall away from its commutator K', and the relay O' will be deënergized, thereby opening at the points $a^8$ $b^8$ the circuit, whereby the the full power of the track-battery $B^3$ was applied to the rails of the block A' and restoring the connection with two cells in multiple of such battery through the contacts $a^8$ $b^9$, and in consequence of this operation the current flowing through the rear-relay coils G, H, and E will be reduced. Under this reduced current the home-signal rear relay G H will still hold its armature forward and will maintain the movable commutator-brush $f$ against the commutator K; but the distant-signal rear-relay coils E will not hold their armature, and therefore their armature-lever $e$ will fall, opening the contacts $e$ $e'$, and thereby deënergizing the relay-coils S and the holding-clutch coils D and closing the contacts $e$ $e^2$, and thereby closing a circuit, whereby the home-signal clutch C becomes a holding-clutch; but the current of these two cells in multiple of the battery $B^3$, through the home-signal rear-relay coils H G, will maintain the movable brush $f$ against the commutator, and the circuit whereby the home-signal clutch C will become a holding-clutch will be closed through the brushes $f$ and 3, as follows: from battery $B^2$ by wire 42, movable brush $f$, brush 3, wire 67, brush 20 of home-signal commutator J, and the plate 150 of such commutator, wire 68, metallically connected to this plate, coils of home-signal clutch C, wire 69, and the plate 151 of commutator J, with which plate the wire 69 is metallically connected, brush 18, (which is now at the line marked "Safety,") wire 70, contacts $e^2$ $e$, and wire 45, back to battery. The current flowing through this circuit will be more powerful than that flowing through these coils when they act as a brake-clutch, as will be hereinafter described, and will be sufficient to hold the home signal in the safety position. The distant signal is now free to go to "danger" under the action of its counterweight, and as it approaches nearly to the danger position its movement is slowed down by its brake-clutch C' through a circuit closed for a sufficient interval to perform this function, this circuit being as follows: from the main battery $B^2$ by wire 71, brush 22 of the commutator J' of this brake-clutch C', plate 152, wire 72, clutch-coils C', wire 73', plate 153, brush 21, wires 74 70, contacts $e^2$ $e$, and wire 45, back to battery. This circuit is opened at the brush 21 as the distant signal reaches the danger position. The resistance of the clutch-magnetizing coils of this circuit is so adjusted that it is not a holding-circuit, but only acts to retard the movement of the distant-signal. In this respect the clutch-magnetizing coils of this circuit of the distant-signal brake-clutch are different from those of the home-signal brake-clutch, which is normally a holding-clutch, but is reduced by the resistance R in its brake-circuit to a retarding or brake clutch. The deënergization of the coils S, which resulted from the opening of the contacts $e$ $e'$, caused the closing of the contacts $s'$ $t'$, completing a circuit for the motor by which the distant signal would be forced to "danger" if its counterweight failed to put it to "danger" and by which the commutator will be moved until the brushes are on the line marked "2 to 1 block clear" and by which the circuit above described, which made the home-signal clutch C a holding-clutch, is operated at the brush 3, but not before the commutator movement has caused the holding-clutch coils D to be again energized through the brushes 15 and 16, so that the holding-clutch D replaces the home-signal clutch C and maintains the home signal at "safety." The forcing-circuit for the motor is as follows: from battery $B^2$, through motor M, wire 57, contacts $s'$ $t'$, wire 75, brushes 17 16, and wire 45, back to battery. The actuation of the motor moves the commutator, so that the brushes approach the line marked "2 to 1 block clear," and as the commutator approaches this position the break in the plate of the brush 3 opens the circuit, whereby the home-signal clutch became a holding-clutch, and simultaneously with or just before such reopening of the home-signal clutch-circuit the passing of the brush 15 onto the commutator-plate connected with the brush 16 restores the original circuit above described, whereby the relay S was actuated to close the motor-actuating circuit by which the home signal was originally put to "safety," this restored circuit including the relay-coils S, and the reënergization of these relay-coils S breaking the motor-circuit through contacts $s'\ t'$. Before, however, the break in the commutator-plate passes under the brush 15 the pawl 227 is lifted by the tooth $c^4$ of the ratchet-wheel 225, and thereby the foot-piece 228 of the pawl is brought into contact with the brushes F F, and a motor-circuit completed, as above described, and continued until the tooth passes clear of the pawl.

The conditions above described will continue until the train above described, as in the block A, enters the block A′ and closes a short circuit between the rails of the block A′, cutting off the advance track-battery B³ from the home-signal rear relay G H and from the distant-signal rear relay E. The movable brush $f$ then falls away from the commutator and the circuits for the relays S and O are opened and the clutch-coils D are deënergized. The home signal is now free to go to "danger" under the action of its counterweight, and as it nearly approaches the danger position the brake-clutch circuit is completed for the home-signal clutch C, as follows: from main battery B² by wire 42, movable brush $f$, back contact $g$ of brush $f$, wire 76, including resistance R, brush 19 of commutator J, commutator-plate 150, wire 68, clutch C, wire 69, plate 151, brush 18, wire 70, contacts $e^2\ e$, and wire 45, back to battery. The current flowing through this circuit is reduced by the resistance R to produce the brake-clutch action of the home-signal clutch C, the circuit for the holding-clutch action, as previously described, having in it no resistance other than that of the clutch-coils C and necessary conductors. The forcing-circuit is also completed for the motor to restore the commutator K to normal position, and should the counterweight fail to restore the home signal to the danger position the motor will perform this operation. This forcing-circuit has been heretofore described, and is as follows: from main battery B², through motor M, wire 57, contacts $s'\ t'$, wire 75, brushes 17 16, and wire 45, back to battery. As the commutator approaches the normal danger position, in which position the brushes will be on the line marked "Danger," the break in the commutator-plate of the brush 17 opens the motor-circuit above described; but before this motor-circuit is opened another motor-circuit is closed as a result of the action of the ratchet-tooth $c'$ on the pawl, and the foot-piece 228 of the pawl connects the brushes F F to close such motor-circuit, and this circuit is continued until the pawl passes clear of the tooth $c'$, and therefore the motor-circuit is finally opened at the brushes F F.

Should both the home signal and the distant signal be in the safety position when the train enters the block A′ from the block A, in which case the brushes would be on the line marked "2 blocks clear," or should the distant signal have remained at "danger," in which case the brushes would be on the line marked "1 block clear," the entrance of the train in the block A′ will cut out the advance track-battery B³, deënergizing the home-signal rear relay-coils G H and the distant-signal rear relay-coils E, as above described, and the movable brush $f$ will fall away from the commutator, thereby deënergizing the relays O and S. The signals are then free to go to "danger" under the influence of the counterweights, and failing this the motor will force them to "danger" by the forcing-circuit heretofore described, as follows: from main battery B², through motor M, wire 57, contacts $s'\ t'$, wire 75, brushes 17 16, and wire 45, back to battery, and this circuit will remain closed until the break in the commutator-plate of the brush 17 passes under this brush, and simultaneously therewith a motor-circuit will be closed through the brushes F F, as formerly described, and the motor-circuit will be finally opened at this point. As the signals nearly approach the danger position the movement of the home signal is checked by its brake-clutch through the circuit heretofore described, as follows: from main battery B² by wire 42, movable brush $f$, back contact $g$, wire 76, including resistance R, brush 19, plate 150, wire 68, clutch-coils C, wire 69, plate 151, brush 18, wire 70, contacts $e^2\ e$, wire 45, back to battery. The brake-clutch circuit for the distant signal is from main battery B², by wire 71, brush 22, plate 152, wire 72, coils of clutch C′, wire 73, plate 153, brush 21, wires 74 70, contacts $e^2\ e$, and wire 45, back to battery.

It will be noted that the front and back coils V and W, respectively, of the compound relay V W are in series with each other and with one cell or with all the cells of the battery B′, according to whether $v$ contacts with $w'$ or with $w$. It will also be noted that any circuit leading from wire 32 to wire 41 constitutes a shunt around the back coils W of this relay. Any such shunt-circuit of low enough resistance will so reduce the current passing through the back coils W as to cause the magnetic attraction of the front coils V to preponderate and attract the armature $v$, thus bringing the latter into contact with $w$, and thereby including all the cells of the battery B′ within its circuit; but should the resistance of such a shunt-circuit be sufficiently increased, or should such shunt-circuit be broken, the current in the back coils W would be increased until the attraction of those coils would predominate. In other words, under normal conditions and when there is no shunt-circuit of sufficiently low resistance around or across the terminals of the coils W these coils will predominate, since they are of higher resistance and with a given current develop a greater magnetizing force. In the movement of the commutator toward the danger position a temporary short circuit or shunt-circuit around the coils W is closed through the brushes 11 10, the function of which is to operate the compound relay V W, so that when the signals go to "danger" and upon the commutator assuming the danger position the full power of the opposing battery B' will be put in circuit with the rails of the block A' through the brushes 11 and 12, the commutator bringing the brush 12 into connection with the brush 11 before breaking the connection which it has made between the brushes 10 and 11. This temporary short circuit is as follows: from one cell of the opposing battery B', through wire 31, contacts $w'$ $v$, coils V, wire 32, brushes 11 10, and wires 77 41, back to battery. This temporary short circuit around the coils W causes the attraction of the coils V to preponderate and move the armature-lever $v$ forward, closing the spring or following contacts $v$ $w$ before opening the spring or following contacts $v$ $w'$, and thereby introducing the full power of the opposing battery B' into the circuit without breaking the latter, which now leads from the opposing battery B' through the wire 78 and contacts $w$ to the armature-lever $v$ and thereafter, as above described, through the temporary short circuit. However, as the commutator continues to move toward the normal or danger position this temporary short circuit is opened at the brush 10, but not before a circuit is closed through the brush 12, as follows: from opposing battery B', through wire 78, contacts $w$ $v$, coils V, wire 32, brushes 11 12, wire 33, contacts $s^2$ $r$, wire 34, contacts $b$ $a$, wires 35 38, upper rail, wheels and axles of train, lower rail, wire 39, back coils H, wire 41, back to battery. While this circuit last traced, which is of course in parallel with or shunted around the coils W, is of higher resistance than the temporary short circuit already described, it still shunts enough current from the coils W to enable the coils V to preponderate in their attraction on the armature, so as to retain the latter in its forward position nearer the coils V after it has been placed there through the instrumentality of the temporary short circuit. The function of this operation of the relay V W is to connect the full power of the opposing battery B' with the rails of the block A', so that when the train leaves the block A' to pass out at a siding the short circuit through the wheels and axles of the train will be removed, and the current from the opposing battery B', assuming the block $A^2$ to be clear and the relay O' to be energized, will flow from the upper rail at the front end of the block A' through wire 62', back coils Q' of home and rear blocks front relay, wire 64', also in multiple by wires 62' 50', contacts $a^6$ $b^6$, wire 49', and back coils U' of the home-block front relay to wire 64', and also in multiple therewith by wire 62', front coils P' of home and rear blocks front relay, wire 27' to contacts $a^8$ $b^8$, and also in multiple from wire 62' by wire 50', contacts $a^6$ $b^6$, wire 49', front coils T' of home-block front relay, wire 48', contacts $b^7$ $a^7$ to contacts $a^8$ $b^8$, where the two last-described parallels unite and continue in one circuit still parallel with the first two parallels through wire 47', brushes 7' 8', wire 59', opposing two cells in multiple of battery $B^3$ to wire 64', and thence the four multiples having all united by wire 65' to lower rail of block A', and at the rear end of the block A' from lower rail by wire 39, back coils H of home-signal rear relay and wire 41, back to battery. By this circuit the back coils Q' and U' of the two front relays will be energized in the same direction as by their track-battery $B^3$ and the front coils P' and T' will be energized in the opposite direction. The back coils will be energized by the full power of the opposing battery B', but the path of the current of this battery through the front coils will be in opposition to the current of the track-battery $B^3$. Therefore the preponderance of the back coils which would follow the exit of the train will be assured by this extra battery-power in opposition and the rearward movement of the armature-levers $p'$ and $u^2$ will be assured. The assurance of this operation of the front relays is important for the reason that under extreme wet-weather conditions the resistance of the ground-circuit from rail to rail might be so lowered as to constitute a very low-resistance shunt across the terminals of the back coils in multiple with this ground resistance, so that these back coils might not sufficiently preponderate over the front coils to cause the rearward movement of the armatures, although under all conditions of weather the back coils would hold the armatures in rearward position after they had been moved into such positions wherein they are nearer the back coils than the front coils.

The circuits above described for the opposing battery B', which are established in shunt with the back coils W upon the exit of the train from the block A' are normally of such resistance that they will cause the attraction of these back coils W to preponderate and move the armature-lever $v$ rearwardly, thereby cutting out the extra cells of the opposing battery B' and restoring the normal connection heretofore described of one cell of the battery B' to the rails; but since it requires an appreciable movement of the armature $v$ in order to make contact with $w$ and to break contact with $w'$, and since this movement consumes an appreciable time the full power of the opposing battery B' will have operated the front relays, as above described, before this reduction to normal lesser battery-power is effected. Under extreme wet weather conditions and consequent extreme low resistance of the ground-circuit from rail to rail it is possible that the coils V would continue to hold their armature forward after the train had left the block, thereby maintaining the contacts $v$ $w$ in closed condition and continuing the connection of the full power of the battery B' to the rails, but except under unusual wet weather conditions the increased resistance due to the exit of the train from the block would cause the coils W to preponderate and open the contacts $v$ $w$, thereby leaving in circuit with the rails only one cell of the battery B'. Therefore the consumption of battery will usually be very slight.

Should the block $A^2$ be occupied when the train passes out of the block A' onto a siding or should the train in the block A' pass out into the block $A^2$ in lieu of passing out onto a siding, it is clear that before the train could make its complete exit from the block A' the block $A^2$ would be occupied, the home-signal front relay G' H' would be deënergized, thus deënergizing the relay O' and opening the connections of the home-block rear relay T' U', by means of which connections it was included in parallel with the home and rear blocks front relay P' Q' and in the track-circuit of the opposing battery B', so that the home-block front relay T' U' would have already been deënergized and its armature-lever $u^2$ would have already been retracted by its weighted foot-piece before such complete exit of the train from the block A' and the consequent impression of the full power of the opposing battery B' upon its circuit.

The opening of the contacts $p'$ $q'$, resulting from the exit of a train from the block A' by passing out at a siding deënergizes the rear relays at the rear end of the block $A^2$, and in case the train passes out of the block A' into the block $A^2$ the train also shunts the track-circuit of these rear relays. The movable brush $f'$ then falls away from the commutator, thus deënergizing the relays O' and S' and D', and the circuit of the coils S' is also opened at the points $u^2$ $u^3$, and the signal or signals go to "danger."

I have described the operations which result from the exit of a train from the block A'. In the same manner when the train passes out of the block A a battery at the rear end of the block A, corresponding to the opposing battery B', will assure the preponderance of the back coils of the front relays P Q and T U, and thus compel the opening of the contacts $p$ and $q$ and of the contacts $u$ and $u'$. If the train leaves the block A by a siding, this operation restores the signal-indicating means at the rear end of the block A' to the danger condition. The resulting operation of the commutator will cause the full power of the battery B' to be connected to the rails of the block A', as above described. Should there be no train in the blocks A' or $A^2$ when the train leaves the block A, and therefore both signals at the rear end of the block A' be at "safety," the opposing battery B' will encounter the full power of the track-battery $B^3$, but will sufficiently oppose the current of this battery to assure the opening of the contacts $p'$ $q'$, as above described.

It will be noted from the above description that the compound relay V W controls the opposing battery B', so as to connect either a part thereof (shown as one cell) or the whole battery to the rails at the rear end of the block. The contacts $w'$ and $w$ are following contacts, so that the circuit through one of them is maintained until the circuit through the other is closed, thereby assuring that the coils V W shall not at any time be deënergized. It will also be noted that the relay O controls the track-battery B, the extra power of this battery being on a normally open circuit controlled by this relay through the contacts $a^3$ $b^3$. The contacts $b^3$ and $b^4$ are also following contacts, so that the normally closed circuit of the two cells in multiple of the track-battery shall not be opened at the point $b^4$ until the normally open circuit of the full power of this battery shall be closed at the point $b^3$, and vice versa, so that in the change from the lesser to the greater battery-power or from the greater to the lesser battery-power the home-block front relay P Q shall not at any time be deënergized.

In the construction shown in Fig. 9 I have shown arrangements of circuits and apparatus whereby the home signal of the second block in advance of that occupied by the train is compelled to give the safety indication before the distant signal at the rear end of the block in advance of the train can give the indication of two blocks clear in contrast with the construction just described and shown in Fig. 10, in which the circuits for putting the home signal of the second block in advance to "safety" were first put in condition to move that home signal to the safety position, and then the distant signal at the rear end of the block in advance of the train was moved to the safety position. This arrangement diminishes the number of points of the relay O and adds the commutator-brush 9 and slightly varies the circuits. I have also shown in Fig. 9 a modified arrangement of circuits for controlling a single three-position signal, this arrangement dispensing with the separate brake-clutches C and C' and replacing them by a single break-clutch $C^2$ and replacing the commutator-brush 3 by the commutator-brush 2 and otherwise slightly varying the circuits. In this construction the entrance of a train into the block in rear of the block A will cause the signal at the rear end of the block A' to give the one-block-clear indication providing there is no train in the block A', and similarly the entrance of a train into the block A will cause the signal at the rear end of the block $A^2$ to give the one-block-clear indication, providing there is no train in the block $A^2$. The presence of a train in the block in rear of the block A will cause the front coils P of the home and rear blocks front relay at the front end of the block A to attract the armature-lever $p$ as a result of the connecting with the rails of the block A in multiple of the coils of the home-signal rear relay and distant-signal rear relay at the rear end of the block A, as heretofore described. The closing of the contacts $p\ q$ will cause the signal at the rear end of the block $A'$ to give the one-block-clear indication, closing the following circuit to put the movable brush $f$ against the commutator: from one cell of the battery $B'$ through wire 31, spring or following contact $w'$, armature-lever $v$, front coils V of the compound relay V W, wire 32, brushes 11 and 12, wire 33, contacts $s^2\ r$, wires 34 36, armature-lever $p$, contact $q$, wires 37 and 40, front coils G of the home-signal rear relay G H, and wire 41 back to battery. The movable brush $f$ will be held against the commutator by the advance track-battery $B^3$, as heretofore described, and the movable brush $f$ will energize the relay-coils S by the following circuit: from the main battery $B^2$ by wire 42, movable brush $f$, fixed brush 1, wires 51 52, coils S, wire 53, brushes 15 16, and wire 45 back to battery and in multiple with the relay-coils S through the holding-clutch coils D by a path branching from the circuit just described at the wire 51 through the wire 56, clutch-coils D, and wire 55 back to wire 53 of the circuit just described. The energization of the relay-coils S opens the contacts $s'\ t'$ and $s^2\ r$ and closes the contacts $s'\ t$, and then the advance track-battery $B^3$ maintains the movable brush $f$ against the commutator by a circuit, as above described, through the home-signal rear-relay coils G and H in series. The closing of the contacts $s'\ t$ completes a motor-circuit, as above described, and the holding clutch-circuit having been already closed the signal is moved to the one-block-clear position, and at the conclusion of this movement the motor-circuit is opened, as above described, and the commutator K comes to rest with the brushes on the line marked "1 block clear," and the signal is held in the one-block-clear position by the continued energization of the holding-clutch coils D, while the continued energization of the relay-coils S prevents the closing of a motor-circuit to further actuate the signal. When the commutator reaches the position in which the brushes are on the line marked "1 block clear," as above described, the relay-coils O will be energized by the following circuit, closed at the brush 2: from the main battery $B^2$ by wire 42, movable brush $f$, brush 2, wire 79, relay-coils O, wire 80, contacts $u\ u^4$, wires 81 45 back to battery. The energization of the relay-coils O opens the contacts $a^{10}\ b^{10}$ and $a^3\ b^4$ and closes the contacts $a^3\ b^3$, and the closing of the contacts $a^3\ b^3$ connects the full power of the track-battery B to the rails, and in consequence thereof the signal at the rear end of the block A would give the two-blocks-clear indication. The circuit whereby the full power of the track-battery B is connected to the rails is as follows: from battery B by wire 82, contacts $b^3\ a^3$, wire 27, front coils P of the home and rear blocks front relay, wire 62 to upper rail and also in multiple therewith from the wire 27 by wire 83, brushes 6 7, wire 84, front coils T of the home-block front relay, wire 85, brushes 8 9, wires 86 62 to upper rail and from the lower rail by wires 65 64 back to battery, the current flowing also through the back coils Q and U of these relays in multiple, as before described. The means whereby the signal at the rear end of the block A is caused to give the two-blocks-clear indication will appear from the following description of the operation of similar circuits for the signals at the rear end of block $A'$. The front relays P Q and T U are now connected in multiple with the rails in a circuit having the full power of the track-battery B, as before described, the contacts $p\ q$ remaining closed and the armature-lever $u$ and back contact $u^4$ remaining closed. When the train enters the block A, the contacts $p\ q$ will continue closed, and the contacts $u\ u^4$ will be opened, the entrance of the train into the block having removed the joint resistance of the coils of the home-signal rear relay and distant-signal rear relay at the rear end of block A, as before described. The opening of the contacts $u\ u^4$ deënergizes the relay-coils O, thereby closing the contacts $a^{10}\ b^{10}$ and $a^3\ b^4$ and opening the contacts $a^3\ b^3$. The power applied to the rails through the front relays in multiple is now altered to that of a part (shown as two cells in multiple) of the track-battery B, the current now flowing from this part of the battery through the wire 26 and contact $b^4$ to the armature-lever $a^3$ and from this armature-lever $a^3$, as before described. The closing of the contacts $a^{10}\ b^{10}$ connects the distant-signal rear-relay coils E in multiple with the home-signal rear-relay coils G H to the rails of the block $A'$, the part of this circuit from rail to rail being as follows: from the upper rail by wires 38 36, contacts $p\ q$, wire 37, brushes 5 4, wire 88, contacts $a^{10}\ b^{10}$, wire 60, distant-signal rear-relay coils E, wires 61, 39, to lower rail and in multiple therewith by a path branching from the wire 37 by the wire 40, through the home-signal rear-relay coils G and H and wire 39 to the lower rail. The joint resistance of the home-signal rear-relay coils G and H and the distant-signal rear-relay coils E is such that when they are connected in multiple with the rails the home and rear blocks front-relay coils $P'$ will attract the armature $p'$, and the closing of the points $p'\ q'$ will cause the signal at the rear end of block $A^2$ to give the one-block-clear indication providing there is no train in the block $A^2$, as before described, and this will connect to the rails of the block $A'$ the full power of the advance track-battery B³ with the front relays P' Q' and T' U' in multiple, as above described, relative to the track-battery B and the front relays P Q and T U, and the distant-signal rear-relay coils E will then attract their armature, closing the contacts e e' and causing the actuation of the motor to put the signal at the rear end of the block A' to the position indicating two blocks clear, and the commutator K will be advanced, so that the brushes will be on the line marked "2 blocks clear."

Should the block A² become occupied by a train after the signal at the rear end of the block A² has given the one-block-clear indication and the signal at the rear end of the block A' has given the two-blocks-clear indication, the signal at the rear end of the block A² will go to "danger," because of the shunting of the track-battery circuit, whereby the home-signal rear-relay coils G' H' are energized and the movable brush f'' held against the commutator, and the movable brush f'' will fall away from the commutator, opening the circuits of the relay-coils O' and S' and of the holding-clutch D', and the signal is now free to go to "danger" under the influence of its counterweight.

The deënergization of the relay-coils O' opens the circuit, whereby the full power of the advance track-battery B³ is connected to the rails, and in consequence thereof the distant-signal rear-relay coils E will fail to hold up their armature, and the contacts e e' will open and e e² will close. Thereupon the signal at the rear end of the block A' may move from the two to one block clear position under the influence of its counterweight. Before describing this operation I will first describe the means whereby the signal at the rear end of the block A² is forced by the motor to the danger position should its counterweight fail to move it to "danger," and the commutator of this signal is rotated to bring the brushes on the line marked "Danger."

The deënergization of the coils S' closes the contacts s³ t³, completing the following circuit for the motor: from the advance main battery B⁴ through motor M', wire 57', contacts s³ t³, wire 75', brushes 17' 16', wire 45' back to battery. This circuit completes the revolution of the commutator from the one-block-clear position to the danger position, the commutator moving forward through the intermediate positions "2 blocks clear" and "2 to 1 block clear," and the motor-circuit being finally opened at the brushes F' F', as before described. As the signal approaches nearly to the danger position, whether forced thereto or moving under the influence of its counterweight, a circuit is completed through the brake-coils C³ to retard the movement of the signal, as follows: from the main battery B⁴, through wire 42', brush f', back contact g', wire 76', brush 19' of brake-clutch commutator J³, plate 156 of such commutator, wire 89', metallically connected with such plate, brake-clutch coils C³, wire 90', plate 157 of brake-clutch commutator, brush 18', wire 91', contacts e⁵ e³, and wire 45' back to battery. This circuit is finally opened at the brush 18'.

As the commutator K' in its movement passes the two to one block clear position and moves toward the danger position the circuit for the home-block front relay T' U' is opened at the brushes 7' and 9', restoring it to its normally deënergized condition.

At the same time that the commutator opens the circuit of the home-block front relay T' U', as above described, it closes a circuit for the advance opposing battery B⁵ through the brushes 11' 10', and this circuit remains closed for a short interval, sufficient to effect the movement of the armature of the relay V' W', and is then opened at the brushes 11' 10'; but a circuit is simultaneously closed through the brushes 11' 12', which connects the full power of the advance opposing battery B⁵ with the rails of the block A², for the purpose of providing a circuit which will when the train leaves the block A² assure the movement of the armature of the front relays at the front end of the block A² to their rearward positions, as heretofore described relative to Fig. 10. The circuit closed through the brushes 11' 10' is as follows: from one cell of the opposing battery B⁵ through wire 31', contacts w³ v', coils V', wire 32', brushes 11' 10', wires 72' 41', back to battery. The circuit closed through the brushes 11' 12', including the full power of the opposing battery B⁵ and applying that power to the rails of the block A², may be traced to and from such rails as follows: from battery B⁵ by wire 78', contacts w² v', coils V', wire 32', brushes 11' 12', wire 33', contacts s⁴ r', wires 34' 38', to upper rail of block A², and from lower rail of block A² by wire 39', coils H, and wire 41', back to battery.

As before described, the closing of the contacts e e² and the opening of the contacts e e' left the signal at the rear end of the block A' so that it could move from the two to the one block clear position under the influence of its counterweight, and this movement is accomplished under the control of the retarding action of the brake-clutch C² and the forward movement of the motor. The circuit for the brake-clutch C² is closed at the contacts e e², and is as follows: from the main battery B² through wire 42, movable brush f, fixed brush 1, wire 51, brush 20 of brake-clutch commutator J², (the brake-clutch commutator J² being in the two-blocks-clear position,) plate 155 of such commutator, wire 89, metallically connected to such plate, clutch-coils C², wire 90, plate 154, metallically connected to such wire, brush 18, wire 91, contacts e² e, and wire 45 back to battery. This circuit is closed during the movement of the signal from the two-blocks-clear to the one-block-clear position.

The motor-circuit is closed by the opening of the contacts $e\ e'$ and the consequent deënergization of the coils S, and the holding-clutch coils D are also deënergized by the opening of the contacts $e\ e'$. The motor-circuit is from the main battery $B^2$ through motor M, wire 57, contacts $s'\ t'$, wire 75, brushes 17 16, and wire 45 back to battery. The circuit for the holding-clutch coils D remains open until the commutator K has been moved by the motor nearly to the two to one block clear position, and is then closed through the brushes 15 16 as follows: from main battery $B^2$ through wire 42, movable brush $f$, fixed brush 1, wires 51 56, holding-clutch coils D, wires 55 53, brushes 15 16, and wire 45, back to battery. The mechanical operation whereby the retarding movement of the brake-clutch $C^2$ in connection with the forward movement of the motor causes the signal to attain the one-block-clear position with the holding-clutch armature against its magnet D has been already described. After the holding-clutch coils D have been energized and just before the signal reaches the one-block-clear position the brake-clutch commutator $J^2$ opens the circuit of the brake-clutch coils $C^2$ at the brush 20.

At the same time that the holding-clutch coils D are energized the relay-coils S are energized by a circuit closed at the brushes 15 16 as follows: from main battery $B^2$ by wire 42, movable brush $f$, fixed brush 1, wires 51 52, coils S, wire 53, brushes 15 16, and wire 45 back to battery. The energization of the relay-coils S opens the motor-circuit at the contacts $s'\ t'$; but the motor-circuit is simultaneously temporarily closed and finally opened at the brushes F F, as before described.

When the train enters the block A' or leaves the block A at a siding, the circuits under the control of which the movement is effected of the signal to the danger position are the same whether the signal and commutator K are at the two-blocks-clear position or the signal is at the one-block-clear position and the commutator K at the two to one block clear position. When the train leaves the block A at a siding, it removes from a circuit, such as has been described relatively to the block A', the shunting action of its wheels and axles and permits the current of the opposing battery at the rear end of the block A to assure the opening of the contacts $p\ q$ and the closing of the contacts $u\ u^4$, and the opening of the contacts $p\ q$ opens the track-circuit of the home-signal rear relay G H and the movable brush $f$, leave the commutator K, opening the circuits of the relay-coils S and the clutch-coils D, and the signal is now free to go to "danger" under the influence of its counterweight retarded in its movement by the brake-clutch $C^2$ through the following circuit, closed at the back contact $g$ and brake-clutch commutator-brush 19: from the main battery $B^2$ through wire 42, movable brush $f$, back contact $g$, wire 76, brush 19, commutator-plate 155, wire 89, coils of brake-clutch $C^2$, wire 90, commutator-plate 154, brush 18, wire 91, contacts $e^2\ e$, and wire 45 back to battery. A motor-circuit is also closed at the contacts $s'\ t'$, which completes the revolution of the main commutator to the danger position and would force the signal to "danger" if its counterweight failed to move it to "danger," as above described, and as the brush 10 meets the break in its commutator-plate and is joined to the brush 11 the following circuit is completed: from one cell of the opposing battery B' by wire 31, contacts $w'\ v$, coils V, wire 32, brushes 11 10, wires 72 41, back to battery. This causes the coils V to attract their armature and closes the contacts $v\ w$, and the full power of the opposing battery B' is applied to the rails of the block A' when the brushes 11 and 12 are connected by the commutator, the part of this circuit to and from the rails being as follows: from the opposing battery B' by wire 78, contacts $w\ v$, coils V, wire 32, brushes 11 12, wire 33, contacts $s^2\ r$, wires 34 and 38 to upper rail and from lower rail through wire 39, coils H, and wire 41 back to battery. It will be observed that this circuit corresponds to that already described of the opposing battery $B^5$, and the function of this circuit is to assure the opening of the contacts $p'\ q'$ and the closing of the contacts $u^5\ u^6$ and the consequent restoration of the signal at the rear end of the block $A^2$ to "danger," which was put to the one-block-clear position when the train entered the block A.

Should the train pass from the block A into the block A', its wheels and axles would shunt the current of the track-battery $B^3$ through the home-signal rear relay G H and the distant-signal rear relay E, and by thus causing the movable brush $f$ to leave the commutator K causes the operation above described, except that the train being in the block A' would prevent the opening of the contacts $p'\ q'$ and closing the contacts $u^5\ u^6$, assured by the action of the opposing battery B', as above described, until the train left the block A'.

In the construction shown in Fig. 8 I have illustrated the circuits and apparatus at the rear ends of two consecutive blocks A' and $A^2$, the circuits and apparatus of the advance block $A^2$ being the same as just described, except that they are combined with two brake-clutch commutators $J^4$ and $J^5$ for controlling two signals— a home signal and distant signal—these commutators corresponding to the commutators J and J' in Fig. 10, and the circuits and apparatus in rear of the block A' being combined with an indicator or switch-lock or combined indicator and switch-lock or other switch-controlling means for controlling the entrance of a train to the block A' from a siding. The coils I' of this switch-controlling means, which coils I shall denominate the "switch-coils," are shown.

In the construction shown in Fig. 8 the home-signal rear relay is replaced by an electric translating device having two pairs of front coils G and $G^2$, the coils G being for the signal and the coils $G^2$ for the switch-controlling device, and two pairs of back coils H and $H^2$, the coils H being for the signal and the coils $H^2$ being for the switch-controlling device, and a single armature carrying the movable brush $f$, controlled by all four pairs of coils, thus comprising a home-signal rear relay having opposed coils G H and a switch rear relay having opposed coils $G^2 H^2$. The home-signal rear relay is normally deënergized, and the switch rear relay is normally energized. This construction permits the normally energized switch rear relay-coils to be wound of higher resistance for economy of battery-power. The armature of the home and rear blocks front relay P Q is provided with two conducting-fingers $p$ and $u^9$, insulated from each other, and separate contacts $q^2$ and $u^7 u^8$ are provided therefor. The function of the contacts $p\ q^2$ is to provide a normally closed track-circuit for the switch rear relay $G^2 H^2$.

The contacts $u^9 u^7$ provide a normally open circuit for the relay-coils S and the contacts $u^9 u^8$ a normally closed circuit for a relay I, controlling a normally closed circuit for the switch-controlling device, and which relay I shall denominate the "switch-controlling" relay I'.

With no train in the block A or A' or the block in the rear of the block A the circuit of the switch-coils I' would be in the normal closed condition. The track-circuit to hold the movable brush $f$ against the commutator K is also normally closed. This track-circuit is as follows: from two cells in multiple of the advance track-battery $B^3$ through wire 26', contacts $b^9 a^8$, wire 27', front coils P' of the home and rear blocks front relay, wire 62', to upper rail of block A', wires 38 36, contacts $p\ q^2$, wire 92, switch rear-relay coils $G^2$ and $H^2$ in series, and wire 39 to lower rail of block A', and through wires 65' 64', back to battery, and in multiple therewith from the front coils P', through the back coils Q' and wire 64', back to battery. This circuit holds the movable brush $f$ against the commutator K and holds closed the following circuit for the switch-controlling relay I: from the main battery $B^2$ by wire 42, movable brush $f$, fixed brush 1, wires 51 93, switch-controlling relay I, wire 94, contacts $u^8 u^9$, wire 54, brushes 15 16, and wire 45, back to battery. This holds closed the contacts $i\ i^2$ and $i^3\ i^9$, completing the following line-circuit for the switch-coils I': from main battery $B^2$ by wire 42, movable brush $f$, fixed brush 1, wires 51 93, contacts $i\ i^2$, line-wire 97, switch-coils I', wire 140, contacts $i^6\ i^7$, line-wire 98, contacts $i^3\ i^9$, wire 99, and wire 45, back to battery. With the circuits in this normal condition a train could enter the block A' from the siding. The movement of the switch to enable the train to enter the block would open the contacts $i^6\ i^7$ in a manner well understood, and in consequence of the opening of the contacts $i^6\ i^7$ the signals at the rear end of the block A' are prevented from indicating "safety" and the distant signal at the rear end of the block A is prevented from giving the two-blocks-clear indication. Should a train now enter the block in rear of the block A, it would, as before described, cause the front coils P of the home and rear blocks front relay to attract their armature, closing the contacts $u^9 u^7$ and opening the contacts $p\ q^2$ and $u^8\ u^9$. The opening of the contacts $p\ q^2$ deënergizes the switch rear relay $G^2\ H^2$, and the movable brush $f$ therefore falls away from the commutator, thereby deënergizing the switch-controlling relay I and opening the contacts $i\ i^2$ and $i^3\ i^9$ and closing $i\ i^3$, $i^3\ i^{15}$, and $i'\ i^5$. The switch-controlling relay I was also deënergized by the opening of the contacts $u^8\ u^9$. The closing of the contacts $i^8\ i^{15}$ and of the contacts $i'\ i^5$ partially completed the circuit for the opposing battery B'; but this circuit is now open at the contacts $i^6\ i^7$, and therefore the movable brush $f$ cannot again be brought into contact with the commutator so long as these contacts $i^6\ i^7$ are open. From this it will be noted that should the switch be left open the signals at the rear end of the block A' and the distant signal at the rear end of the block A would be held at "danger."

After the train has left the siding and taken possession of the block A' and the switch has been closed, the following circuit for the opposing battery B' will be completed: from one cell of the opposing battery B', by wire 31, contacts $w'\ v$, coils V, wire 32, brushes 11 12, wire 33, contacts $s^2\ r$, wire 101, contacts $i^{15}\ i^8$, line-wire 98, contacts $i^7\ i^6$, wire 102, upper rail of block A', wires 38 103, contacts $i'\ i^5$, wires 121 40, front coils G of home-signal rear relay, and wire 41, back to battery. The back coils H of this relay are in multiple (as regards this circuit of the battery B') with the front coils G through a branch of the circuit including the wheels and axles of the train, the said branch proceeding from the circuit above described at the upper rail, through the wheels and axles of the train, lower rail, wire 39, back coils H and wire 41 back to battery; but as the armature is closer to the back coils H the movable brush cannot be brought into contact with the commutator K. Therefore a train in the block in rear of the block A cannot clear the home signal at the rear end of the block A', and therefore the distant signal at the rear end of the block A cannot indicate two blocks clear, but the home signal at the rear end of the block A can clear for the train, providing there is no train in the block A. Should, however, the train which entered the block A' from a siding leave the block A' before the train in the block in rear of the block A reached the signals at the rear end of the block A, the circuit above described for the opposing battery B', having no longer a path through the wheels and axles of the train, would have in it the resistances before described at the front end of the block A', and therefore the front coils G of the home-signal rear relay would attract their armature, and therefore the movable brush f would contact with the commutator K, closing the following circuit for the relay-coils S: from main battery B², by wire 42, movable brush f, fixed brush 1, wires 51 52, coils S, wire 104, contacts $u^7 u^6$, wire 54, brushes 15 16 and wire 45 back to battery. The energization of the coils S opens the contacts $s^2 r$, thereby opening the circuit for the opposing battery B', whereby the movable brush f was moved into contact with the commutator, but the track-battery B³ will energize the coils G and H in series through the rail-circuit of the block A', which I will now describe, and thereby the movable brush f will be maintained against the commutator. This rail-circuit through the coils G and H in series is as follows: from two cells in multiple of the advance track-battery B³, through the wire 26', contacts $b^9 a^8$, wire 27', front coils P' of home and rear blocks front relay, wire 62', to upper rail of block A', and from upper rail of block A' by wires 38 103, contacts $i' i^5$, wires 121 40, coils G and H in series, wire 39 to lower rail of block A' and by wires 65' 64', back to battery, and in multiple therewith through back coils Q' and by wire 64' back to battery.

The closing of the contacts $s' t$, resulting from the energization of the relay S, completes the motor-circuit, as before described, and the clutch-coils D are energized by the following circuit: from the main battery B² by wire 42, movable brush f, fixed brush 1, wires 51 93, contacts $i i^3$, wire 122, clutch-coils D, wires 55 54, brushes 15 16, and wire 45 back to battery. The home signal will now go to "safety," the commutator will advance, so that the brushes will be on the line marked "1 block clear," and the circuit before described relative to Fig. 9 will be closed through the brushes f and 2, whereby the relay-coils O will be energized, and the full power of the track-battery B will be connected to the rails to cause the distant signal at the rear end of the block A to indicate "two blocks clear."

Should a train have taken possession of the block in rear of the block A before the trainman attempted to open the switch from the siding to the block A', the switch-coils I' would be in a deënergized condition by reason of the opening of the contacts $p q^2$ and consequent deënergization of the switch rear-relay coils G² H² and the falling away of the movable brush f from the commutator and also by reason of the opening of the contacts $u^9 u^8$, each of these operations deënergizing the switch-controlling relay I. The deënergization of the switch-controlling relay I opens the circuit for the switch-coils I' at the contacts $i i^2$, and this circuit is also opened at the movable brush f, and in consequence thereof the switch-controlling device would be in the danger condition. Should the train in rear now pass onto the block A, it will close the contacts $p' q'$ at the rear end of the block A², and if the block A² is not occupied by a train will clear the home signal at the rear end of the block A² and the distant signal at the rear end of the block A', as before described. Now should this train leave the block A by a siding or otherwise without entering the block A' a battery at the rear end of the block A corresponding to the opposing battery B' would, as before described, assure the opening of the front contacts and the closing of the back contacts of the front relays P Q and T U. This opening of contacts puts the signal or signals at the rear end of the block A' to the normal danger position. As the commutator K reaches the position in which the brushes 11 10 are electrically connected the contacts $w v$ will be closed, as before described, and the subsequent connecting of the brushes 11 12 will complete and maintain a circuit whereby the full power of the opposing battery B' is connected to the rails of the block A', thereby assuring the operation of the armature of the home and rear blocks front relay P' Q' to permit or compel the home signal at the rear end of the block A² to return to "danger" should it have indicated "safety." This circuit flows from the opposing battery B' by wire 78, contacts $w v$, coils V, wire 32, brushes 11 12, wire 33, contacts $s^2 r$, wire 101, contacts $i^5 i^8$, line-wire 98, contacts $i^7 i^6$, wire 102 to the upper rail of block A' and opposes or overpowers the battery B³, as heretofore described, and returns from the lower rail by wire 39, back coils H of home-signal rear relay and wire 41 back to battery. The closing of the contacts $p q^2$ and $u^9 u^8$ reëstablishes the normally closed rail-circuit for the switch rear relay G² H², the normally closed circuit for the switch-controlling relay I, and the normally closed line-circuit for the switch-coils I'.

Should the train enter the block A' from the block A, the track-circuit of the advance track-battery B³ for the rear relays G H and G² H² will be shunted by the train, as above described, and in consequence thereof the movable brush f will fall away from the commutator and the signal will go to "danger," as before described, and the circuits of the switch-controlling relay I and of the switch-coils I', controlled by the movable brush, cannot be closed, and the switch-controlling device remains in the danger condition. The movable brush f cannot now be moved into contact with the commutator by the opposing battery B', because of the circuit through the wheels and axles of the train, whereby the home-signal rear-relay coils G and H are energized in multiple, as before described.

When the train leaves the block A', the normally closed circuit heretofore described for energizing the switch-relay $G^2$ $H^2$ to hold the movable brush $f$ against the commutator and by energizing the switch-controlling relay I restore the normally closed line-circuit for the switch-coils I' will be closed, and then so long as no train has entered the block A' or the block A or the block in rear of the block A a train may enter the block A' from the siding.

The construction shown in Fig. 7 embodies all features of my invention hereinafter claimed. In this construction the circuits and apparatus for signals at the rear ends of two blocks A' and $A^2$ are shown, the circuits and apparatus to the left at the rear end of the block $A^2$ corresponding to those shown in Fig. 10 and those to the right at the rear end of the block A' being combined with a switch-controlling device controlling a siding in the block A'. In this construction, as in the construction shown in Fig. 10, the home signal at the rear end of the second block in advance of a train (as the block A', with a train in the block in rear of the block A) is not compelled to give the one-block-clear indication before the distant signal immediately in advance of the train (as the distant signal at the rear end of the block A) gives the two-blocks-clear indication; but the circuits for such advance home signal (as the signal at the rear end of the block A') must be in the condition for this indication of "one block clear" before the distant signal immediately in advance of the train (as the distant signal at the rear end of the block A) can indicate "two blocks clear." In this construction (shown in Fig. 7) the switch-controlling device at the siding in the block A' would continue in the safety condition until a train entered the block A, whereas in the construction shown in Fig. 8 and above described the entrance of a train in the block in rear of the block A would put the switch-controlling device in the danger condition. In this construction, as in that shown in Fig. 8, in the block containing the siding switch rear-relay coils $G^2$ and $H^2$ are provided for the normally closed circuits, whereby the switch-coils I' are normally energized. The normally closed circuits of the switch-controlling relay I and of the switch-coils I' are the same as have been described relative to Fig. 8 except that the contacts of the circuit of the switch-controlling relay I and of the switch rear relay $G^2$ $H^2$ and the relay S are in the home-block front relay T U instead of the home and rear blocks front relay P Q. The circuits of the relay O are now in the home and rear blocks front relay P Q instead of the home-block front relay T U and include an additional battery $B^7$ and at times include the switch-coils I'. The switch-controlling relay I has a number of additional points, and the commutator-brushes 6, 7, 8, and 9 and corresponding commutator-plates are omitted.

With no train in the block A' or the block A the circuit of the switch-coils I' would be closed and the movable brush $f$ against the commutator K. The circuit whereby the movable brush $f$ is held against the commutator flows through the coils of the switch rear relay $G^2$ $H^2$ and may be traced as follows: from two cells in multiple of the advance track-battery $B^3$ and through wire 26', contacts $b^9$ $a^8$, wire 27', front cells P' of home and rear blocks front relay, wire 62' to upper rail of block A', wire 38, contacts $u^{16}$ $u^{17}$, wire 92, coils $G^2$ and $H^2$ in series, wire 39, lower rail of block A', and wires 65' 64' back to battery, and in multiple with this circuit, starting from the front coils P' by the back coils Q' and wire 64' back to battery. The normally closed circuit for the coils of the switch-controlling relay I flows from the main battery $B^2$ by wire 42, movable brush $f$, fixed brush 1, wires 51 93, coils of relay I, wire 94, contacts $u^5$ $u$, wire 54, brushes 15 16, and wire 45 back to battery. This holds closed the contacts $i$ $i^2$, $i^{10}$ $i^{11}$, and $i^8$ $i^9$, completing the following circuit for the switch-coils I'; from main battery $B^2$ by wire 42, movable brush $f$, fixed brush 1, wires 51 93, contacts $i$ $i^2$, line-wire 97, switch-coils I', wire 140, contacts $i^6$ $i^7$, line-wire 98, contacts $i^8$ $i^9$, wire 116, contacts $p^3$ $q^5$, and wires 100 45 back to battery. With the circuits in this normal condition a train could enter the block A' from the siding, as before described, the movement of the switch would open the contacts $i^6$ $i^7$, and this would prevent the home signal at the rear end of the block A' from indicating "safety" and the distant signal at the rear end of the block A from giving the two-blocks-clear indication. Should a train now enter the block in rear of the block A, it would cause the front coils P of the home and rear blocks front relay to attract their armature, closing the contacts $p^3$ $q^4$. The closing of the contacts $p^3$ $q^4$ would bring the coils O in series with the switch-coils I' if the contacts $i^6$ $i^7$ were closed, as will be now described.

The train in the block in rear of the block A closed the points $p^3$ $q^4$, thereby putting the relay-coils O in series with the switch-coils I'; but the following circuit for the relay-coils O being opened at the points $i^6$ $i^7$ the relay-coils O cannot attract their armature, and therefore the full power of the track-battery B required for assuring the closing of contacts at the rear end of the block A corresponding to the contacts $e$ $e'$ cannot be obtained, and the distant signal at the rear end of the block A cannot give the two-blocks-clear indication. This circuit for the relay-coils O, which is open at the points $i^6$ $i^7$, is as follows: from main battery $B^2$ by wire 42, movable brush $f$, fixed brush 1, wires 51 93, contacts $i$ $i^2$, line-wire 97, switch-coils I', wire 140, contacts $i^6$ $i^7$, (now open,) line-wire 98, contacts $i^8$ $i^9$, wire 116, contacts $p^3$ $q^4$, wire 117, additional battery $B^7$, coils O, and wires 119 45 back to battery. It will therefore be noted that the closing of the contacts $i^6$ $i^7$ would close this circuit, and the armature-levers of the relay O would be actuated to close the contacts $a'$ $b'$, $a^2$ $b^2$, and $a^3$ $b^3$. The closing of these contacts would complete a circuit whereby the full power of the track-battery B would be connected to the rails of the block A, causing the distant signal at the rear end of the block A to go to "safety." This circuit is as follows: from the track-battery B by wire 46, contacts $i^{11}$ $i^{10}$ and $b^3$ $a^3$, wire 27, front coils P of home and rear blocks front relay to wire 62, and from wire 27 by contacts $a^2$ $b^2$, wire 48, front coils T of home-block front relay, wire 49, contacts $b'$ $a'$, wire 50, to wire 62, and by wire 62 to upper rail of block A and through the joint resistance of the home-signal rear relay and the distant-signal rear relay at the rear end of the block A, returning by lower rail of the block and by wire 65 to wire 64 and in multiple therewith from one side of the front coils P by back coils Q of home and rear blocks front relay to wire 64 and from one side of the front coils T by back coils U of home-block front relay to wire 64 and from wire 64 back to battery. The armatures of the front relays are not actuated, as before described, the armature of the home and rear blocks front relay P Q being still held in the forward position and the armature of the home-block front relay T U remaining in rearward position.

The presence of a train in the block in rear of the block A would not prevent a train from leaving the siding and taking possession of the block A' if the block A were clear of trains, and should a train under such conditions leave the siding and enter the block A' the opening of the points $i^6$ $i^7$ in the operation of the switch-controlling device would by opening the circuit for the relay-coils O, and thereby opening the front contacts $a^3$ $b^3$, controlled thereby, open the circuit for the full power of the track-battery and would thereby put the distant signal at the rear end of the block A to "danger." The front contact $b^3$ and the back contact $b^4$ of the finger $a^3$ of the relay O are following or flexible contacts, so that the circuit through the front contact will not be opened until the circuit through the back contact has been closed, and vice versa, the opening of the contacts occurring in the extreme positions of the armature-finger, and therefore the circuit of the front coils P of the home and rear blocks front relay through $a^3$ $b^3$ is maintained until the circuit for the same coils through the contacts $a^3$ $b^4$ is closed. Therefore the contacts $p^3$ $q^4$ are continued in closed condition. The presence of the train in the block A' would shunt the current of the advance track-battery $B^3$ from the switch rear-relay coils $G^2$ $H^2$, thereby causing the movable brush $f$ to fall away from the commutator and deënergizing the switch-controlling relay I. The deënergization of the switch-controlling relay I will cause the closing of the back contacts thereof $i$ $i^3$, $i^{10}$ $i^{12}$, $i^{13}$ $i^{14}$, $i^8$ $i^{16}$, and $i'$ $i^5$ and the opening of the front contacts thereof $i$ $i^2$, $i^{10}$ $i^{11}$, and $i^8$ $i^9$. The closing of the points $i^{13}$ $i^{14}$ would cause the relay-coils O to be again energized by the following circuit: from additional battery $B^7$ through coils O, wires 119 120, contacts $i^{13}$ $i^{14}$, wire 116, contacts $p^3$ $q^4$, and wire 117 back to battery. The closing of the contacts $i^{12}$ $i^{10}$, however, maintains the circuit for the two cells in multiple of the track-battery B both during and upon this completion of the movement of the finger $a^3$, thereby continuing the closed condition of the contacts $p^3$ $q^4$. This circuit is as follows: from two cells in multiple of the track-battery B, by wires 26 141, contacts $i^{12}$ $i^{10}$ and $b^3$ $a^3$, and then as before described. This circuit maintains the multiple connections of the two front relays P Q and T U with the rails of the block A. As this circuit is energized by only two cells in multiple of the track-battery B, it can only cause the home signal at the rear end of the block A to remain at "safety" for the train in rear of the block A. It will therefore be noted that the presence of the train in the block A' would maintain the home signal of the block A at "danger" and the distant signal at the rear end of the block A at "danger;" but if the block A were clear of trains the home signal of the block A would indicate "one block clear."

Should the train in the block A' leave that block before the train in the block in rear of the block A enters the block A, the restoration of the normally closed circuit of the switch-controlling relay I which would result from the passage of the train out of the block A', provided the points $i^6$ $i^7$ remain closed, opens the points $i^{13}$ $i^{14}$ and deënergizes the relay-coils O, but during the movement of the armature-finger $a^3$ from $b^3$ to $b^4$, as before described, the armature-finger $i^{10}$ will continue the previously-described circuit from the two cells in multiple of the track-battery B through the coils P Q and T U of the front relays in multiple until replaced by a circuit through $b^4$ $a^3$ from the same two cells in multiple, energizing only the coils P Q of the home and rear blocks front relay, as before described, and thereby the closed condition of the contacts $p^3$ $q^4$ will be continually maintained and the home signal at the rear end of the block A continued at "safety" for the approaching train; but upon the opening of the contacts $i^{10}$ $i^{11}$ and $i^8$ $i^9$ the circuit for the relay-coils O in series with the switch-coils I' will be restored, providing the points $i^6$ $i^7$ remain closed by the circuit previously described from the main battery $B'$, and thus the switch-controlling device will be restored to the safety condition.

If the train in rear of the block A entered the block A under the one-block-clear indication before the train from the siding left the block A', the home and the distant signal at the rear end of the block A' would be at "danger" until the train from the siding left the block A'. The entrance of the train into the block A would open the points $u^{16} u^{17}$ and $u u^6$ and close the points $u u'$ by reason of the removal of the joint resistance of the coils of the home-signal rear relay and distant-signal rear relay at the rear. The opening of the points $u^{16} u^{17}$ opens the normally closed track-circuit of the switch rear relay $G^2 H^2$; but this relay is now shunted by the train in the block A'. The opening of the points $u u^6$ further opens the circuit of the switch-controlling relay I, which was opened at the movable brush $f$ when the train from the siding entered the block A'.

When the train from the siding leaves the block A', the full power of the battery B' will be applied to oppose or overcome the battery $B^3$ and assure the opening of the points $p' q'$ and $u^2 u^3$, as heretofore described, and the battery B' will by the more powerful energization of the front coils G of the home-signal rear relay cause the movable brush $f$ to come in contact with the commutator. This energizes the relay-coils S by the circuit heretofore described and opens the circuit of the opposing battery B' at the contacts $s^2 r$, and the advance track-battery $B^3$ continues the movable brush $f$ against the commutator by its circuit through the coils G and H in series and the circuits for the clutch-coils and motor will be completed. The circuit for the motor is the same as in Fig. 10 and other figures. The circuit for the clutch-coils is the same as in Fig. 18. The home signal at the rear end of block A' will clear for the approaching train in the block A, and the distant signal at the rear end of the block A' will also indicate two blocks clear as soon as the block $A^2$ is clear of trains.

Should the approaching train in the block A enter the block A', it will in the manner already described continue the switch-controlling device in the danger condition, and this condition will be maintained so long as the train occupies the block A'. As soon as the block A and the block A' are clear of trains the normally closed circuits above described will be restored and the switch-controlling device thus restored to the safety condition.

In the construction just described means are provided for holding normally open the actuating-circuits of the home-block front relays, as T U. I have illustrated in Fig. 11 a construction which has been simplified by the omission of this feature and the inclusion of each of the front relays in permanently-closed local circuits with a part, shown as two cells in multiple, of the track-battery, as B. In other respects the constructions heretofore described are not departed from.

The omission of the means for holding normally open the home-block front relays simplifies the construction both of signals that are not combined with indicators in the same block, as shown at the left in Fig. 11, and of signals that are combined with indicators in the same block, as shown to the right in Fig. 11. In signals without indicators several contacts of the relay O and the commutator-brushes 6, 7, 8, and 9 and corresponding commutator-plates are omitted. In signals with indicators several contacts of the relays O and I are omitted.

The normally closed track-circuit for the switch rear relay $G^2 H^2$ and the normally closed circuits for the switch-controlling relay I and the switch-coils I' are the same as heretofore described.

The circuit whereby the track-battery B is connected to the rails of the block A differs from that heretofore described in that the coils T U of the home-block front relay are connected in permanently-closed multiples from wire 27 through wire 123 through the front coils T and from the front coils T directly to the wire 62 and from the front coils T through the back coils U to the wire 64. The consequence of this alteration is that the normal output of battery is through the joint resistance of the two front relays in multiple instead of through the greater resistance of the home and rear blocks front relay P Q only.

In the construction shown in Fig. 12 the block to the left has circuits and apparatus corresponding to those shown in Fig. 10, and the block to the right has two sidings therein and for each siding a home indicator or other switch-controlling device and a distant indicator, the coils of both switch devices being shown. The switch-controlling device may be a combined indicator and switch-lock or other device, and these indicators or other devices or combined indicators and other devices will for convenience be referred to as "home" indicators and "distant" indicators. In this construction I have arranged the circuits so that the control of the home indicators is exerted from the block containing the siding and from two blocks in rear of the block containing the siding instead of from the block containing the siding and the block in rear, as in the construction shown in Fig. 7, and the distant indicator is controlled from the block in advance of the block containing the siding.

The normally closed track-circuit through the switch rear relay $G^2 H^2$, whereby the movable brush $f$ is normally held against the commutator K, is as follows: from two cells in multiple of the advance track-battery $B^3$, by wire 26', contacts $b^9 a^8$, wire 27', front coils P' of home and rear blocks front relay, wire 62', upper rail of block A', wire 38, contacts $p\ q^2$, wire 92, coils $G^2\ H^2$, wire 39, lower rail of block A', and wires 65' 64' back to battery, and in multiple with this circuit through the back coils Q' of the same front relay and wire 64' back to battery. The normally closed circuit for the switch-controlling relay I is as follows: from the main battery $B^2$, by wire 42, movable brush $f$, brush 1, wires 51 93, relay I, wire 94, contacts $q^5\ p^3$, wire 124, contacts $u^6 u$, wire 54, brushes 15 16, and wire 45 back to battery. The normally closed line-circuit for the home indicator-coils I' and $I^3$ is as follows: from main battery $B^2$, by wire 42, movable brush $f$, brush 1, wires 51 93, contacts $i\ i^2$, line-wire 97, home indicator-coils I', line-wire 129, home indicator-coils $I^3$, wire 126, contacts $i^{16}\ i^{18}$, line-wire 125, contacts $i^6\ i^7$, line-wire 98, contacts $a\ b$, contacts $i^3\ i^9$, and wires 100 45 back to battery. With these circuits in the normally closed condition a train could enter the block A' from either siding, and should it enter at either siding the operations would be substantially the same. I will therefore describe it only as entering at the rear siding shown. Should a train enter the block from the rear siding shown, the movement of the switch would open the contacts $i^6\ i^7$ and close the contacts $i^{17}\ i^{19}$, completing the following circuit for the distant indicator-coils $I^2$: from two cells in multiple of the advance track-battery $B^3$, by wire 26', contacts $b^9\ a^8$, wire 27', front coils P' of home and rear blocks front relay, wire 62', upper rail of block A', wire 102, contacts $i^{17}\ i^{19}$, wire 127, distant indicator-coils $I^2$, wire 128, lower rail of block A', and wires 65' 64' back to battery, and with the back coils Q' of the same front relay in multiple with this circuit, as before described. It will be noted that the coils $G^2\ H^2$ of the switch-rear relay are also in multiple with the distant indicator-coils $I^2$ through a path branching from the upper rail through wire 38, contacts $p\ q^2$, wire 92, coils $G^2\ H^2$, and wire 39 to lower rail. It is immaterial, however, whether or not under these conditions the switch rear relay will maintain the movable brush $f$ against the commutator, for the reason that the normally closed line-circuit for the home indicator-coils I' has been opened at the points $i^6\ i^7$.

The resistance of the circuit closed through the contacts $i^{17}\ i^{19}$ and through the distant indicator-coils $i^2$, as above described, is so proportioned that it will, in effect, replace the resistance of the circuit through the two signal rear relays G H and E, as above described, and will cause the armature of the home and rear blocks front relay P' Q' to be actuated to close the contacts $p'\ q'$ and will not cause the actuation of the armature of the home-block front relay T' U'. Should the movable brush $f$ fall away from the commutator, and thereby put the home-signal rear-relay coils G H into multiple with the distant indicator-coils $I^2$, the lowering of the resistance of the circuit resulting from this operation would not cause the armature of the home-block front relay T' U' to be actuated. This multiple connection would be as follows: from the upper rail by wires 38 103, contacts $i'\ i^5$, wire 121, home-signal rear-relay coils G and H in series, and wire 39 to lower rail.

The closing of the contacts $p'\ q'$ will if there is no train in the block $A^2$ cause the movable brush $f'$ to be brought in contact with the commutator K', and the movable brush $f'$ will be held against the commutator by the track-battery at the front end of the block $A^2$ in the manner before described. This will energize the coils O', as before described, and put the full power of the advance track-battery $B^3$ in circuit with the rails of the block A', and with such full power of the track-battery $B^3$ applied to the rails the distant indicator-coils $I^2$ will be sufficiently energized to operate the distant indicator to indicate two blocks clear. Should, however, a train be at this time in the block $A^2$, the full power of the track-battery $B^3$ could not be applied to the rails and the two cells in multiple of this battery would not sufficiently energize the distant indicator-coils $I^2$ to effect the two-blocks-clear indication and the distant indicator would remain at "danger."

The opening of the points $i^6\ i^7$ would prevent the home signal at the rear end of the block A' from indicating safety and the distant signal at the rear end of the block A from giving the two-blocks-clear indication. Should a train now enter the block in rear of the block A, it would cause the front coils P to attract their armature, closing the contacts $p^3\ q^4$ and opening the contacts $p\ q^2$ and $p^3\ q^5$. The opening of the contacts $p^3\ q^5$ deënergizes the switch-controlling relay I, opening the front contacts $i\ i^2$ and $i^3\ i^9$ and closing the back contacts $i\ i^3$, $i^8\ i^{15}$, $i'\ i^5$, $i^{20}\ i^{21}$, and $i^{22}$ and $i^{23}$. The opening of the contacts $p\ q^2$ deënergizes the switch rear relay $G^2\ H^2$, and the movable brush $f$ therefore falls away from the commutator. This introduces another break in the circuit of the switch-controlling relay I, the circuit of which was opened at $p^3\ q^5$. The closing of the contacts $i^8\ i^{15}$ and $i'\ i^5$ partially completed the circuit for the opposing battery B'; but this circuit is now open at the contacts $i^6\ i^7$. This circuit is as follows: from one cell of the opposing battery B', by wire 31, contacts $w'\ v$, coils V, wire 32, brushes 11 12, wire 33, contacts $s^2\ r$, wire 101, contacts $i^{15}\ i^8$, $b\ a$, line-wire 98, contacts $i^7\ i^6$, (now open,) wire 125, contacts $i^{18}\ i^{16}$, wire 126, upper rail of block A', wires 38 103, contacts $i'\ i^5$, wire 121, front coils G of home-signal rear relay and wire 41 back to battery, and a circuit in multiple therewith through the back coils H of the same rear relay, as before described. As this circuit is open at the contacts $i^6\ i^7$, the movable brush $f$ cannot be brought against the commutator K by the opposing battery B'. The advance battery $B^3$ has a circuit through the coils G and H in series, as before described, and the distant indicator-coils $I^2$ are now in multiple with the coils G and H in this circuit, as before described; but this circuit can only hold the movable commutator-brush in rearward position. Therefore the signals at the rear end of the block A' will be held at "danger" so long as the contacts $i^6$ $i^7$ are open. As the movable brush $f$ cannot come in contact with the commutator, the circuit for the coils O, partly completed by the closing of the points $p^3$ $q^4$, cannot be closed. This circuit is as follows: from main battery $B^2$, by wire 42, movable brush $f$, (now open,) fixed brush 1, wires 51 43, coils O, wire 130, contacts $q^4$ $p^3$, wire 124, contacts $u^6$ $u$, wire 54, brushes 15 16, wire 45 back to battery. Therefore the coils O cannot attract their armature, and the full power of the track-battery B cannot be applied to the rails of the block A, and hence the distant signal at the rear end of the block A cannot indicate two blocks clear, and this will be true so long as the contacts $i^6$ $i^7$ are open.

After the train has left the siding and taken possession of the block A' and the switch has been closed the control of the signals will be as heretofore described. While the train which entered from the siding remains in the block A' the train in the block in rear of the block A cannot receive the indication of two blocks clear; but should the train in advance leave the block A' before the train in rear entered the block A the distant signal at the rear end of the block A would indicate two blocks clear, as the circuit above described for the opposing battery B' would no longer have a path through the wheels and axles of the train, and therefore the movable brush $f$ would be brought in contact with the commutator by the attraction of the front coils G and the circuit of the coils O would be completed and the circuit of the opposing battery B' opened at the points $a$ $b$. The track-circuit from the advance track-battery $B^3$ would, however, maintain the movable brush $f$ against the commutator by the circuit before described through the coils G and H in series. The energization of the coils O also closes the flexible contacts $a^3$ $b^3$, thereby completing the circuit, whereby the full power of the track-battery B is applied to the rails of the block A to close contacts at the rear end of the block A corresponding to the contacts $e$ $e'$, thereby completing the circuit, whereby the distant signal at the rear end of the block A may indicate two blocks clear. The part of this circuit thus closed at $a^3$ $b^3$ from rail to rail is as follows: from track battery B, by wire 82, contacts $b^3$ $a^3$, wire 27, front coils P of home and rear blocks front relay, wire 62 to upper rail of block A and in multiple therewith, branching from the wire 27 by wire 83, contacts $i^{22}$ $i^{23}$, wire 84, front coils T of home-block front relay, wire 85, contacts $i^{20}$ $i^{21}$, and wire 86 to wire 62, and also the multiples through the back coils Q and U, as before described, and from the lower rail by wires 65 64 back to battery.

It will be noted that so long as the switch-controlling relay I is deënergized by the opening of the points $p^3$ $q^5$, which are opened by the presence of a train in rear of the block A, the home indicator-coils I' and $I^3$ are deënergized and a train cannot enter the block A' from a siding.

Should the train in the block in rear of the block A leave that block A by a siding, the opening of the contacts $p^3$ $q^4$ will be assured by a current from a battery at the rear end of the block A corresponding to the opposing battery B', as before described. The opening of the contacts $p^3$ $q^4$ deënergizes the coils O, and the consequent opening of the contacts $a^3$ $b^3$ and the closing of the contacts $a$ $b$ and $a^3$ $b^4$ restores the normal connection of the two cells in multiple of the track-battery B to the rails of the block A. The closing of the contacts $p^3$ $q^5$ energizes the switch-controlling relay I, but with the consequent opening of the contacts $i^4$ $i^5$ the track-circuit from the advance track-battery $B^3$ for the home-signal rear-relay coils G and H in series is opened; but the path from the advance track-battery $B^3$ for the switch rear-relay coils $G^2$ and $H^2$ in series was closed by the closing of the contacts $p$ $q^2$, and by this latter circuit the movable brush $f$ is maintained against the commutator and the normally closed circuits for the home indicator-coils I' and $I^3$ are restored.

Should the train in rear pass into the block A, the circuit for the coils O would be opened at the contacts $u$ $u^6$, with a consequent restoration of the normal connection of the two cells in multiple of the track-battery B to the rails of the block A. The closing of the contacts $u$ $u'$ energizes the coils S, and the motor-circuits and clutch-circuits are closed and the signals at the rear end of the block A' give the indications which the traffic conditions in advance will permit.

Upon the train leaving the block A, either by a siding or by passing into and out of the block A', the normally closed circuits of the home indicator-coils I' $I^3$ are restored.

In the above description the operations of the switch at the rear siding and the operations resulting from the entrance of a train from this rear siding have been set forth. The advance siding in the block A' has home indicator-coils $I^3$ and distant indicator-coils $I^4$. The home indicator-coils $I^3$ are in series with the corresponding coils I' of the rear siding, and the distant indicator-coils $I^4$ are connected to the rails of the block A' from the upper rail by wire 126, contacts $i^{16}$ $i^{20}$, wire 131, coils I⁴, and wire 132 to lower rail. From the description of the operations at the rear siding it will be seen that the opening of the contacts $i^6$ $i^7$ would open the circuit for the home indicator-coils I³ at the advance siding as well as the home indicator-coils I' at the rear siding, and the opening of the contacts $i^{16}$ $i^{18}$ at the advance siding would also open the circuit of both home indicator-coils I³ and I'. It will also be seen that both sets of contacts $i^6$ $i^7$ and $i^{16}$ $i^{18}$ must be closed for a safety indication at either siding or the safety indications in rear above described and that the control of the circuits and apparatus of these two sidings will be the same.

In the construction shown in Fig. 7 the switch-controlling device is controlled by the signal-indicating means at the rear end of the block A', containing the siding, and is not controlled by the signal-indicating means at the rear end of the block A in rear of such block. The consequence of this construction is that the presence of a train in the block in rear of the block A would not prevent a train entering the main line from the siding, while the presence of a train in the block A would prevent entry of a train from the siding. This operation is dependent upon the fact that a train in the block in rear of the block A does not put the home signal at the rear end of the block A' to "safety," as in the constructions shown in Figs. 8 and 9, as the switch-controlling device is put in the danger condition whenever the signal at the rear end of the block A' indicates "safety." Therefore in the construction shown in Figs. 8 and 9 the presence of a train in the block in rear of the block A necessarily puts the switch-controlling device in the block A' in the danger condition. It is to be noted, however, that I have shown in Fig. 12 a construction resembling that of Fig. 7 in the train control of the signals, but resembling those of Figs. 8 and 9 in the control of the switch-controlling device—that is to say, although the presence of a train in the block in rear of the block A does not cause the home signal to be put to "safety" it nevertheless puts the switch-controlling device or indicator in the danger condition.

In all of the constructions above described careful provision has been made against the holding of any signal in the safety position by the action of foreign currents in accordance with the invention set forth and claimed in my Patent No. 716,179, issued December 16, 1902, and my present invention includes additional means whereby the action of a foreign current is prevented from holding in forward position the armature of the rear relay of a signal combined with an indicator or other switch-controlling device on normally closed circuit. To this end I provide that the normally closed circuit for the switch rear relay G² H² must be opened before the normally open circuit of the home-signal rear relay G H can be closed to put the signal to "safety" and that the signal-controlling means in the operation of putting the signal to "safety" shall first close the circuit of the opposing battery B" to more powerfully energize the front coils of the home-signal rear relay provided there is no train in the block A' and in this operation interpose the current of this battery between the home-signal rear relay and the rails, as above described. Thus although a foreign current might be sufficiently strong to retain the armature of the rear electric translating device G H G² H² in forward position notwithstanding the presence of a train in the block A' the operation of putting the signal to "safety" requires that this foreign-current circuit shall first be opened and the movable brush $f$ allowed to fall away from the commutator and thereafter the home-signal rear relay energized under conditions such that the action of the foreign current will be overcome.

It is evident that various modifications other than those shown and above described may be made in the construction and arrangement of the various circuits and apparatus within the spirit and scope of my invention

What I claim, and desire to secure by Letters Patent, is—

1. The combination of normal danger railway-traffic-controlling means, non-polarized electric translating means controlling the same, conductors of a single circuit extending from such translating means along a railway-line to a point in rear of such traffic-controlling means, and other conductors of a single circuit extending rearwardly from such point in rear of the traffic-controlling means to a point farther in rear thereof, such conductors of single circuits comprising all of the means of electric intercommunication from point to point along the railway-line and such translating means being responsive to control from the conductors last mentioned to perform an operation thereof and responsive to control from the conductors first mentioned to perform another operation thereof.

2. The combination of normal danger railway-traffic-controlling means, non-polarized electric translating means controlling the same, conductors of a single circuit extending from such translating means along a railway-line to a point in rear of such traffic-controlling means, and other conductors of a single circuit extending rearwardly from such point in rear of the traffic-controlling means to a point farther in rear thereof, such conductors of the single circuits comprising all the means of electric communication between such points, and such translating means being responsive to control from the conductors last mentioned to perform an operation thereof and responsive to control from the conductors first mentioned to continue such operation thereof and also to perform another operation thereof.

3. The combination of railway-traffic-controlling means, electric translating means controlling the same, conductors of a circuit extending from such translating means rearwardly along a railway-line, means for effecting a reduction of the resistance of such circuit and means for effecting a further reduction of the resistance thereof, the electric translating means being responsive to the first-mentioned reduction of resistance to perform an operation thereof and responsive to the last-mentioned reduction of resistance to perform another operation thereof.

4. The combination of railway-traffic-controlling means, electric translating means controlling the same, conductors of a circuit extending from such translating means rearwardly along a railway-line, means for effecting a reduction of the resistance of such circuit and means for effecting a further reduction of the resistance thereof, the electric translating means being responsive to the first-mentioned reduction of resistance to perform an operation thereof and responsive to the last-mentioned reduction of resistance to continue such operation thereof and also to perform another operation thereof.

5. The combination of railway-traffic-controlling means, two relays controlling the same, conductors of a circuit connected with both of such relays and extending therefrom along a railway-line to a point in rear of such traffic-controlling means, and other conductors of a circuit extending rearwardly from such point in rear of the traffic-controlling means to a point farther in rear thereof, one of such relays being responsive to control from the conductors last mentioned and the other of such relays being responsive to control from the conductors first mentioned.

6. The combination of railway-traffic-controlling means, two relays controlling the same, conductors of a circuit connected to both of such relays and extending from such relays along a railway-line to a point in rear of such traffic-controlling means, and other conductors of a circuit extending rearwardly from such point in rear of the traffic-controlling means to a point farther in rear thereof, one of such relays being responsive to control from the conductors last mentioned and both of such relays being responsive to control from the conductors first mentioned.

7. The combination of railway-traffic-controlling means, two relays controlling the same, conductors of a circuit connected to both of such relays and extending rearwardly along a railway-line, means for effecting a reduction of the resistance of such circuit and means for effecting a further reduction of the resistance thereof, one of such relays being responsive to the first-mentioned reduction of resistance and the other of such relays being responsive to the last-mentioned reduction of resistance.

8. The combination of railway-traffic-controlling means, two relays controlling the same, conductors of a circuit connected to both of such relays and extending therefrom rearwardly along a railway-line, means for effecting a reduction of the resistance of such circuit and means for effecting a further reduction of the resistance thereof, one of such relays being responsive to the first-mentioned reduction of resistance and both of such relays being responsive to the last-mentioned reduction of resistance.

9. A railway signaling system comprising non-polarized electric translating means, signal-indicating means controlled thereby, a rail-circuit connected to such electric translating means and extending therefrom to a point in rear of the indicating means and another rail-circuit extending rearwardly from such point in rear of the indicating means to a point farther in rear thereof, such translating means being responsive to control from the rail-circuit last mentioned to perform an operation thereof and responsive to control from the rail-circuit first mentioned to perform another operation thereof.

10. A railway signaling system comprising electric translating means, signal-indicating means controlled thereby, a rail-circuit connected to such electric translating means and extending therefrom to a point in rear of the indicating means and another rail-circuit extending rearwardly from such point in rear of the indicating means to a point farther in rear thereof, such translating means being responsive to control from the rail-circuit last mentioned to perform an operation thereof and responsive to control from the rail-circuit first mentioned to continue such operation thereof and also to perform another operation.

11. A railway signaling system comprising electric translating means, signal-indicating means controlled thereby, a rail-circuit connected to such electric translating means and extending rearwardly therefrom, means for effecting a reduction of the resistance of such rail-circuit and means for effecting a further reduction of the resistance thereof, the electric translating means being responsive to the first-mentioned reduction of resistance to perform an operation thereof and responsive to the last-mentioned reduction of resistance to perform another operation thereof.

12. A railway signaling system comprising electric translating means, signal-indicating means controlled thereby, a rail-circuit connected to such electric translating means and extending rearwardly therefrom, means for effecting a reduction of the resistance of such rail-circuit and means for effecting a further reduction of the resistance thereof, the electric translating means being responsive to the first-mentioned reduction of resistance to perform an operation thereof and responsive to the last-mentioned reduction of resistance to continue such operation thereof and also to perform another operation thereof.

13. A railway signaling system comprising a signal-indicator, two non-polarized relays controlling the indicator, a rail-circuit in operative relation to both relays and extending rearwardly from the indicator and comprising the rails of the railway-track, one of the relays being responsive to an electric impulse transmitted along the railway-line solely through the rails of such rail-circuit and controllable from a point in rear of the indicator, and the other relay being responsive to an electric impulse also transmitted along the railway-line solely through the rails of such rail-circuit but controllable from a nearer point in rear of the signal-indicator.

14. A railway signaling system comprising a signal-indicator, two non-polarized relays controlling the indicator, a rail-circuit in operative relation to both relays and extending rearwardly from the indicator and comprising the rails of the railway-track, one of the relays being responsive to an electric impulse transmitted along the railway-line solely through the rails of such rail-circuit and controllable from a point in rear of the indicator, and the other relay being responsive to an electric impulse also transmitted along the railway-line solely through the rails of such rail-circuit but controllable from a nearer point in rear of the signal-indicator and the first-mentioned relay being also governable by the second-mentioned electric impulse to maintain such relay *in statu quo*.

15. A railway signaling system comprising a rail-circuit having an extension from point to point along the railway-line comprised wholly within the rails of the railway-track, two relays in operative relation to such rail-circuit and responsive to variations in the resistance thereof, a signal-indicator governable by the relays, and resistance-varying means in rear of the indicator to actuate one of the relays by a variation of the resistance of the rail-circuit and to actuate the other relay by a further variation of such resistance.

16. A railway signaling system comprising a rail-circuit having an extension from point to point along the railway-line comprised wholly within the rails of the railway-track, two relays in operative relation to such rail-circuit and responsive to variations in the resistance thereof, a signal-indicator governable by the relays, and resistance-varying means in rear of the indicator to actuate one of the relays by a variation of the resistance of the rail-circuit and to actuate the other relay by a further variation of such resistance while maintaining the first-mentioned relay *in statu quo*.

17. An electric railway signaling system comprising an electric translating apparatus, a signal-indicator controllable by two operations thereof, a controlling-circuit coöperative with such translating apparatus and extending to rearward of the signal-indicator and including two conductors which comprise all the means of electric communication with such translating apparatus from points in rear of the signal-indicator, means for influencing the controlling-circuit from a distant point in rear of the signal-indicator to effect one operation of the translating apparatus and for influencing the controlling-circuit from a nearer point in rear of the signal-indicator to effect the other operation of the translating apparatus.

18. An electric railway signaling system comprising an electric translating apparatus, a signal-indicator controllable by two operations thereof, a controlling-circuit coöperative with such translating apparatus and extending to rearward of the signal-indicator and including two conductors which comprise all the means of electric communication with such translating apparatus from points in rear of the signal-indicator, means for influencing the controlling-circuit from a distant point in rear of the signal-indicator to effect one operation of the translating apparatus and for influencing the controlling-circuit from a nearer point in rear of the signal-indicator to effect the other operation of the translating apparatus, and to continue the first operation thereof.

19. An electric railway signaling system comprising two relays, a signal-indicator controllable by the two relays, a controlling-circuit coöperative with both such relays and extending to rearward of the signal-indicator and including two conductors which comprise all the means of electric communication with such relays from points in rear of the signal-indicator, means for influencing the controlling-circuit from a distant point in rear of the signal-indicator to actuate one of the relays and for influencing the controlling-circuit from a nearer point in rear of the signal-indicator to actuate the other relay.

20. An electric railway signaling system comprising two relays, a signal-indicator controllable by the two relays, a controlling-circuit coöperative with both such relays and extending to rearward of the signal-indicator and including two conductors which comprise all the means of electric communication with such relays from points in rear of the signal-indicator, means for influencing the controlling-circuit from a distant point in rear of the signal-indicator to actuate one of the relays and for influencing the controlling-circuit from a nearer point in rear of the signal-indicator to actuate the other relay, and to continue the actuation of the first-mentioned relay.

21. An electric railway signaling system comprising an electric translating apparatus, a signal-indicator controllable by two operations thereof, a controlling-circuit coöperative with such translating apparatus and extending to rearward of the signal-indicator and including the rails of the railway-track as conductors, such rails comprising all the means of electric communication with such translating apparatus from points in rear of the signal-indicator, means for influencing the controlling-circuit from a distant point in rear of the signal-indicator to effect one operation of the translating apparatus and for influencing the controlling-circuit from a nearer point in rear of the signal-indicator to effect the other operation of the translating apparatus.

22. An electric railway signaling system comprising an electric translating apparatus, a signal-indicator controllable by two operations thereof, a controlling-circuit coöperative with such translating apparatus and extending to rearward of the signal-indicator and including the rails of the railway-track as conductors, such rails comprising all the means of electric communication with such translating apparatus from points in rear of the signal-indicator, means for influencing the controlling-circuit from a distant point in rear of the signal-indicator to effect one operation of the translating apparatus and for influencing the controlling-circuit from a nearer point in rear of the signal-indicator to effect the other operation of the translating apparatus and to continue the first - mentioned operation thereof.

23. An electric railway signaling system comprising two relays, a signal-indicator controllable by both such relays, a controlling-circuit coöperative with both such relays and extending to rearward of the signal-indicator and including the rails of the railway-track as conductors, such conductors comprising all the means of electric communication with both such relays from points in rear of the signal-indicator, means for influencing the controlling-circuit from a distant point in rear of the signal-indicator to actuate one of such relays and for influencing the controlling-circuit from a nearer point in rear of the signal-indicator to actuate the other of such relays.

24. An electric railway signaling system comprising two relays, a signal-indicator controllable by both such relays, a controlling-circuit coöperative with both such relays and extending to rearward of the signal-indicator and including the rails of the railway-track as conductors, such conductors comprising all the means of electric communication with both such relays from points in rear of the signal-indicator, means for influencing the controlling-circuit from a distant point in rear of the signal-indicator to actuate one of such relays and for influencing the controlling-circuit from a nearer point in rear of the signal-indicator to actuate the other of such relays and to continue the actuation of the first-mentioned relay.

25. An electric railway signaling system comprising an electric translating apparatus, a signal controllable by two operations thereof, a controlling rail-circuit in operative relation to the translating apparatus and extending to rearward of the signal, and a second controlling rail-circuit in operative relation to the first-mentioned controlling-circuit and extending to rearward of the first circuit, each of such controlling rail-circuits including the rails of a block or section of the railway-track and such rails comprising all the means of electric communication from end to end of their respective blocks, the translating apparatus being controllable by the first controlling-circuit and the first controlling-circuit being controllable by the second controlling-circuit, and means for influencing the second controlling rail-circuit to effect one operation of the translating apparatus and for influencing the first controlling rail-circuit to effect the other operation of the translating apparatus.

26. An electric railway signaling system comprising an electric translating apparatus, a signal controllable by two operations thereof, a controlling rail-circuit in operative relation to the translating apparatus and extending to rearward of the signal, and a second controlling rail-circuit in operative relation to the first-mentioned controlling-circuit and extending to rearward of the first circuit, each of such controlling rail-circuits including the rails of a block or section of the railway-track and such rails comprising all the means of electric communication from end to end of their respective blocks, the translating apparatus being controllable by the first controlling-circuit and the first controlling-circuit being controllable by the second controlling-circuit, and means for influencing the second controlling rail-circuit to effect one operation of the translating apparatus and for influencing the first controlling rail-circuit to effect the second operation of the translating apparatus and to continue or maintain the first-mentioned operation thereof.

27. An electric railway signaling system comprising two relays, a signal controllable by both such relays, a controlling rail-circuit in operative relation to both such relays and extending to rearward of the signal, and a second controlling rail-circuit in operative relation to the first-mentioned controlling-circuit and extending to rearward of the first circuit, each of such controlling rail-circuits including the rails of a block or section of the railway-track and such rails comprising all the means of electric communication from end to end of their respective blocks, both relays being controllable by the first controlling-circuit and the first controlling-circuit being controllable by the second controlling-circuit, and means for influencing the second controlling rail-circuit to actuate one of the relays and for in fluencing the first controlling rail-circuit to actuate the other relay.

28. An electric railway signaling system comprising two relays, a signal controllable by both such relays, a controlling rail-circuit in operative relation to both such relays and extending to rearward of the signal, and a second controlling rail-circuit in operative relation to the first-mentioned controlling-circuit and extending to rearward of the first circuit, each of such controlling rail-circuits including the rails of a block or section of the railway-track and such rails comprising all the means of electric communication from end to end of their respective blocks, both relays being controllable by the first controlling-circuit and the first controlling-circuit being controllable by the second controlling-circuit, and means for influencing the second controlling rail-circuit to actuate one of the relays and for influencing the first controlling rail-circuit to actuate the other relay and to maintain the first-mentioned relay *in statu quo*.

29. An electric traffic-controlling system for railways comprising a traffic-controlling circuit including a source of electric energy of given power, a source of electric energy of greater power, a traffic-controlling apparatus controllable by the traffic-controlling circuit, and means controllable by the approach of a train from the rear and toward the traffic-controlling apparatus for connecting the source of electric energy of greater power in the traffic-controlling circuit.

30. An electric traffic-controlling system for railways comprising a traffic-controlling circuit including a source of electric energy of given power, a source of electric energy of greater power, a traffic-controlling apparatus controllable by the traffic-controlling circuit, and means controllable by the approach of a train from the rear and toward the traffic-controlling apparatus for connecting the source of electric energy of greater power in the traffic-controlling circuit and means controllable by the progression of a train in advance of the traffic-controlling apparatus for disconnecting such source of electric energy of greater power from the traffic-controlling circuit.

31. The combination of normal danger railway signal-indicating means constructed to indicate one block clear and two blocks clear, controlling means for effecting the one-block-clear indication with a current of given power and the two-blocks-clear indication with a current of greater power, a source of electric energy of given power and a source of electric energy of greater power, means subject to the control of a train in the block in advance of the indicating means for connecting in circuit with the controlling means the source of electric energy of lesser power, and means subject to the control of a train in the second block in advance of the indicating means for connecting in circuit with the controlling means the source of electric energy of greater power.

32. The combination of railway signal-indicating means constructed to indicate one block clear and two blocks clear, controlling means for effecting the one-block-clear indication with an electric current of given power and the two-blocks-clear indication with an electric current of greater power, one or more sources of electric energy adapted to send to the controlling means the current of lesser power and the current of greater power, means subject to the control of a train in the block in advance of the indicating means for sending the current of lesser power through the controlling means, and means subject to the control of a train in the second block in advance of the indicating means for sending the current of greater power through the controlling means and means for reducing the flow of current to the lesser power when the train enters the block in advance of the indicating means.

33. The combination of railway signal-indicating means constructed to indicate one block clear and two blocks clear, controlling means for effecting the one-block-clear indication with an electric current of given power and the two-blocks-clear indication with an electric current of greater power, a source of electric energy of given power and a source of electric energy of greater power, means subject to the control of a train in the block in advance of the indicating means for connecting in circuit with the controlling means the source of electric energy of lesser power, and means subject to the control of a train in the second block in advance of the indicating means for connecting in circuit with the controlling means the source of electric energy of greater power and for disconnecting such source of greater power from such circuit when the train enters the block in advance of the indicating means.

34. The combination of railway signal-indicating means constructed to indicate one block clear and two blocks clear, controlling means for effecting the one-block-clear indication with an electric current of given power and the two-blocks-clear indication with an electric current of greater power, a source of electric energy of given power on a normally closed circuit and a source of electric energy of greater power on a normally open circuit, means subject to the control of a train in the block in advance of the indicating means for connecting in circuit with the controlling means the source of electric energy of lesser power, and means subject to the control of a train in the second block in advance of the indicating means for closing the normally open circuit of the source of electric energy of greater power and connecting such source of electric energy of greater power in circuit with the controlling means.

35. The combination of railway signal-indicating means constructed to indicate one block clear and two blocks clear, controlling means for effecting the one-block-clear indication with an electric current of given power and the two-blocks-clear indication with an electric current of greater power, a source of electric energy of given power on a normally closed circuit and a source of electric energy of greater power on a normally open circuit, means subject to the control of a train in the block in advance of the indicating means for connecting in circuit with the controlling means the source of electric energy of lesser power, and means subject to the control of a train in the second block in advance of the indicating means for closing the normally open circuit of the source of electric energy of greater power and connecting such source of electric energy of greater power in circuit with the controlling means and opening the circuit of such source of electric energy of greater power when the train passes the indicating means.

36. The combination of railway signal-indicating means constructed to indicate one block clear and two blocks clear, controlling means for effecting the one-block-clear indication with an electric current of given power and the two-blocks-clear indication with an electric current of greater power, a relay located at the front end of the block in rear of the indicating means and controllable by the presence of a train in such block to close a circuit, subject to the control of a train in the block in advance of the indicating means, for sending the current of lesser power through the controlling means, and electric translating apparatus located at the front end of the block or section in advance of the indicating means and controllable by the presence of a train in the block in rear of the indicating means to close a circuit subject to the control of a train in the second block in advance of the indicating means, for sending the current of greater power through the controlling means.

37. The combination of railway signal-indicating means constructed to indicate one block clear and two blocks clear, controlling means for effecting the one-block-clear indication with an electric current of given power and the two-blocks-clear indication with an electric current of greater power, two rail-circuits one in advance and one in rear of the indicating means, each rail-circuit including a source of electric energy of given power connected therein and including the rails of the block or section as conductors comprising all the means of electric communication from the beginning to the end of the block or section, a relay located at the front end of the rear block or section and connected in the rail-circuit thereof so as to be operated by the presence of a train in such block or section to connect the rail-circuit of the advance block or section with the controlling means and thereby send the current of lesser power through the controlling means, and electric translating apparatus located at the front end of the advance block or section and constructed to be operated by the presence of a train in the rear block or section, to connect the rail-circuit of the advance block or section with the source of electric energy of greater power, subject to the control of a train in the second block in advance of the indicating means, and thereby to send the electric current of greater power through the controlling means.

38. The combination of railway signal-indicating means constructed to indicate one block clear and two blocks clear, controlling means for effecting the one-block-clear indication with an electric current of given power and the two-blocks-clear indication with an electric current of greater power, two rail-circuits, one of the block in rear of the indicating means and the other of the block in advance of the indicating means, each rail-circuit including a source of electric energy of given power connected therein and including the rails of the block or section as the only conductors from the beginning to the end of the block or section, a source of electric energy of greater power on a normally open circuit, means controlling such source and controllable by the front relay of the advance block or section, relays located at the front ends of such blocks or sections and connected to the rails, the front relay of the rear block or section controlling the rail-circuit of the advance block or section to connect the same with the controlling means, the front relay of the advance block or section being controlled by the presence of a train in the rear block or section, through the rail-circuit of the advance block or section, to actuate the switching means to connect in the rail-circuit of such advance block or section, subject to the control of a train in the second block in advance of the indicating means, the source of electric energy of greater power.

39. The combination of railway signal-indicating means constructed to indicate one block clear and two blocks clear, controlling means for effecting the one-block-clear indication with an electric current of given power and the two-blocks-clear indication with an electric current of greater power, two rail-circuits, one of the block in rear of the indicating means and the other of the block in advance of the indicating means, each rail-circuit including a source of electric energy of given power connected therein and including the rails of its block or section as the only conductors from the beginning to the end of the block or section, a front relay of the rear blocks, a home-block front relay and a home and rear blocks front relay of the advance block, a source of electric energy of greater power on a normally open circuit, the front relay of the rear block controlling the rail-circuit of the advance block to connect the same with the controlling means, and means controllable jointly by the home and rear blocks front relay of the advance block and by a train in the second block in advance of the indicating means, to connect in the rail-circuit of the advance block the source of electric energy of greater power, such means of connecting being also controllable by the home block front relay of the advance block to open the circuit of such source of electric energy of greater power.

40. The combination of a home-signal rear relay and a distant-signal rear relay of a railway block or section, the home-signal rear relay being constructed to operate with a current of given power and the distant-signal rear relay being constructed to operate with a current of greater power, normal danger-signal indicating means controlled thereby so that the actuation of the home-signal rear relay effects the indication of one block clear and of the distant-signal rear relay effects the indication of two blocks clear, a source of electric energy of given power and a source of electric energy of greater power, means subject to the control of a train in the block in advance of the indicating means for connecting the source of electric energy of lesser power in circuit with the home-signal rear relay, and means subject to the control of a train in the second block in advance of the indicating means for connecting the source of electric energy of greater power in circuit with the distant-signal rear relay.

41. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, one or more sources of electric energy adapted to send to the rear relays the current of lesser power and the current of greater power, means subject to the control of a train in the block in advance of the indicating means for sending the current of lesser power to the home-signal rear relay, and means subject to the control of a train in the second block in advance of the indicating means for sending the current of greater power to the distant-signal rear relay and for reducing the flow of current to the lesser power when the train enters the block in advance of the indicating means.

42. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, a source of electric energy of given power and a source of electric energy of greater power, means subject to the control of a train in the block in advance of the indicating means for connecting the source of electric energy of lesser power in circuit with the home-signal rear relay, and means subject to the control of a train in the second block in advance of the indicating means for connecting the source of electric energy of greater power in circuit with the distant-signal rear relay and for disconnecting such source of greater power from such circuit when the train enters the block in advance of the indicating means.

43. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay by establishment of the current of given power effects the indication of one block clear and of the distant-signal rear relay by establishment of the current of greater power effects the indication of two blocks clear, a source of electric energy of given power on a normally closed circuit and a source of electric energy of greater power on a normally open circuit, means subject to the control of a train in the block in advance of the indicating means for connecting the source of electric energy of lesser power in circuit with the home-signal rear relay, and means subject to the control of a train in the second block in advance of the indicating means for closing the normally open circuit of the source of electric energy of greater power and connecting such source of electric energy of greater power in circuit with the distant-signal rear relay.

44. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, a source of electric energy of given power on a normally closed circuit and a source of electric energy of greater power on a normally open circuit, means subject to the control of a train in the block in advance of the indicating means for connecting the source of electric energy of lesser power in circuit with the home-signal rear relay, and means subject to the control of a train in the second block in advance of the indicating means for closing the normally open circuit of the source of electric energy of greater power and connecting such source of electric energy of greater power in circuit with the distant-signal rear relay and means for opening the circuit of such source of electric energy of greater power when the train enters the block in advance of the indicating means.

45. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, a relay located at the front end of the block in rear of the indicating means and constructed to be operated by the presence of a train in such block to close a circuit, subject to the control of a train in the block in advance of the indicating means, for sending the current of lesser power through the home-signal rear relay, and a relay located at the front end of the block or section in advance of the indicating means and constructed to be operated by the presence of a train in the block in rear of the indicating means to close a circuit, subject to the control of a train in the second block in advance of the indicating means, for sending the current of greater power through the distant-signal rear relay.

46. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, two rail-circuits, one in advance and the other in rear of the indicating means, each rail-circuit including a source of electric energy of given power connected therein and including the rails of the block or section as the only conductors of the circuit from the beginning to the end of the block or section, a relay located at the front end of the rear block or section and connected in the rail-circuit thereof so as to be operated by the presence of a train in such block or section to connect the rail-circuit of the advance block or section with the home-signal rear relay and thereby send the current of lesser power therethrough, and a relay located at the front end of the advance block or section and constructed to be operated by the presence of a train in the rear block or section to connect the source of electric energy of greater power with the rail-circuit of the advance block or section and with the distant-signal rear relay, subject to the control of a train in the second block in advance of the indicating means, and thereby to send the current of greater power through the distant-signal rear relay.

47. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, two rail-circuits, one in advance and the other in rear of the indicating means, each rail-circuit including a source of electric energy of given power connected therein and including the rails of the block or section as the only conductors of the circuit from the beginning to the end of the block or section, a source of electric energy of greater power on a normally open circuit, relays located at the front ends of such blocks or sections and connected to the rails, the front relay of the rear block or section controlling the rail-circuit of the advance block or section to connect the same with the two rear relays, the front relay of the advance block or section being controlled by the presence of a train in the rear block or section, through the rail-circuit of the advance block or section, to connect in the rail-circuit of such advance block or section, subject to the control of a train in the second block in advance of the indicating means, the source of electric energy of greater power.

48. The combination of a home-signal rear relay and a distant-signal rear relay of a railway block or section, the home-signal rear relay being constructed to operate with a current of given power and the distant-signal rear relay being constructed to operate with a current of greater power, signal-indicating means controlled thereby so that the actuation of the home-signal rear relay effects the indication of one block clear and of the distant-signal rear relay effects the indication of two blocks clear, two rail-circuits, one in the block in rear of the indicating means and the other in the block in advance of the indicating means, such advance rail-circuit being in operative relation to the rear relays and each rail-circuit including a source of electric energy of given power connected therein and including the rails of its block or section as the only conductors from the beginning to the end of the block or section, a front relay of the rear block, a home-block front relay and a home and rear blocks front relay of the advance block, a source of electric energy of greater power on a normally open circuit, the front relay of the rear block controlling the rail-circuit of the advance block to connect the same with the distant-signal rear relay, and means controllable jointly by the home and rear blocks front relay of the advance block and by the presence of a train in the second block in advance of the indicating means, to connect in the rail-circuit of the advance block the source of electric energy of greater power, and means controllable by the home-block front relay of the advance block to open the circuit of such source of electric energy of greater power.

49. The combination of two front relays of a railway block or section, a signal controlled thereby, means for operating one front relay from a distant point and the other front relay from a nearer point, a source of electric energy normally connected in circuit with the front relay operated from a distant point, the other front relay being on normally open circuit, and means controlled by the approach of a train for connecting the last-mentioned front relay in closed circuit with the source of electric energy.

50. The combination of two front relays of a railway block or section, a signal controlled thereby, means for operating one front relay from a distant point and the other front relay from a nearer point, a source of electric energy normally connected in circuit with the front relay operated from a distant point, the other front relay being on normally open circuit, and means controlled by the front relay operated from a distant point for connecting the front relay operated from a nearer point in closed circuit with the source of electric energy.

51. The combination of two front relays of a railway block or section, one front relay being constructed to be operated with a given resistance in its circuit and the other front relay being constructed to be operated with a less resistance in its circuit, a signal controlled thereby, a source of electric energy connected in circuit with the front relay operated with greater resistance, the other front relay being on normally open circuit, and means controlled by the approach of a train for connecting the last-mentioned front relay in closed circuit with the source of electric energy.

52. The combination of two front relays of a railway block or section, one front relay being constructed to be operated with a given resistance in its circuit and the other front relay being constructed to be operated with a less resistance in its circuit, a signal controlled thereby, a source of electric energy connected in circuit with the front relay operated with greater resistance, the other front relay being on normally open circuit, and means controlled by the front relay operated with greater resistance for connecting the last-mentioned front relay in closed circuit with the source of electric energy.

53. The combination of front electric translating means constructed to perform two operations and located in proximity to the front end of a block or section, a source of electric energy connected in circuit therewith, rear electric translating means located in proximity to the rear end of the same block or section, means for connecting the rear electric translating means in circuit with the source of electric energy and the front electric translating means to effect one operation of the front electric translating means and removing the resistance of the rear electric translating means from the circuit to effect the other operation of the front electric translating means, a signal in proximity to the front end of the block or section controlled by the front electric translating means, and a signal in proximity to the rear end of the block or section controlled by the rear electric translating means.

54. The combination of two front relays of a block or section connected in a circuit including a source of electric energy, electric translating means located in proximity to the rear end of the same block or section, means for connecting the electric translating means in the circuit to operate one of the front relays and removing the resistance of such electric translating means from the circuit to operate both front relays, a signal in proximity to the front end of the block or section and controlled by the front relays, and a signal in proximity to the rear end of the block or section and controlled by the electric translating means.

55. The combination of front electric translating means constructed to perform two operations and located in proximity to the front end of a block or section and connected to the rails thereof, a source of electric energy also connected to such rails, rear electric translating means of the same block or section, the rails of such block or section forming the only electrical conductors between the source of electric energy and front electric translating means and the rear electric translating means from the beginning to the end of such block or section, means for connecting the rear electric translating means in the rail-circuit to effect one operation of the front electric translating means, the other operation of the front electric translating means being effected by the removal of the resistance of the rear electric translating means from the rail-circuit due to the presence of a train in the block or section, a signal in proximity to the front end of such block or section controlled by the front electric translating means, and a signal in proximity to the rear end of the block or section controlled by the rear electric translating means.

56. The combination of two front relays connected to the rails of a block or section, a source of electric energy also connected to such rails, the circuit of one of such front relays being normally closed and the circuit of the other normally open, electric translating means located in proximity to the rear end of the same block or section, the rails of such block or section forming the only conductors between the source of electric energy, the front relays, and the electric translating means, from the beginning to the end of such block or section, means for connecting the electric translating means in the rail-circuit to operate the front relay on normally closed circuit, and means for closing the circuit of the other front relay, the operation of the other front relay being effected by the removal of the resistance of the electric translating means from the rail-circuit due to the presence of a train in the block or section, a signal in proximity to the front end of such block or section and controlled by the front relays, and a signal in proximity to the rear end of the block or section and controlled by the electric translating means.

57. The combination of a series of blocks or sections and signals and circuits therefor, the circuits including the rails of each block or section as the only conductors of the signal-circuits from point to point along the line, the signal for each block constructed to indicate one block clear and two blocks clear, and controlling means for such signals combined so that the controlling means of each signal is controlled only by the controlling means of the signal in advance in preventing the giving of the two-blocks-clear indication.

58. The combination of a series of blocks or sections and signals and circuits therefor, the circuits including the rails of each block or section as the only conductors of the signal-circuits from point to point along the line, the signal for each block constructed to indicate one block clear with a current of a certain power and two blocks clear with a current of greater power, and controlling means for such signals combined so that the controlling means of such signal is controlled only by the controlling means of the signal in advance in preventing the sending of the current of greater power for the two-blocks-clear indication.

59. The combination of a series of railway blocks or sections, each block or section having a normally deënergized rear relay and a rail-circuit in controlling relation to such relay and including the rails of the block or section as the only conductors of such circuit from the beginning to the end of each block or section and including a source of electric energy, signal-indicating means controlled by such rear relay, and means controlled by the presence of a train in the second block in rear of the indicating means for connecting each rear relay in its rail-circuit.

60. The combination of a series of railway blocks or sections, each block or section having a normally deënergized home-signal rear relay and a rail-circuit in controlling relation thereto and including the rails of the block or section as the only conductors of such circuit from the beginning to the end of each block or section, home signal-indicating means controlled by such rear relay, and means controlled by the presence of a train in the second block in rear of the indicating means for connecting each rear relay in its rail-circuit.

61. The combination of a railway block or section having a normally deënergized rear relay, located at the rear end of the block or section, a rail-circuit including the rails of the block or section as the only conductors of such circuit from the beginning to the end of such block or section, signal-indicating means controlled by such rear relay and located in proximity thereto, a rail-circuit of the next adjacent block or section in rear including the rails of the block or section as the only conductors of such circuit from the beginning to the end of the block or section, an electric translating apparatus located at the advance end of the last-mentioned block or section and connected to the rails thereof and controlling the rear relay, and means controlled by the presence of a train in a block or section in rear of the last-mentioned block or section for operating the electric translating apparatus and thereby connecting the rear relay in its rail-circuit.

62. The combination of railway signal-indicating means constructed to indicate one block clear and located in proximity to the rear end of a block or section, signal-controlling means therefor including a rear relay on normally open circuit, such rear relay being also located in proximity to the rear end of such block or section, means controlled by the presence of a train in the second block in rear of such indicating means for closing the normally open circuit of such rear relay and, subject to control in advance of such indicating means, putting the signal-controlling means in condition to give the one-block-clear indication, other signal-indicating means located in proximity to the rear end of the block in rear of the first-mentioned indicating means, and constructed to indicate two blocks clear and controlling means therefor controlled by the signal-controlling means first mentioned to effect the two-blocks-clear indication.

63. The combination of railway signal-indicating means constructed to indicate one block clear and located in proximity to the rear end of a block or section, signal-controlling means therefor including a rear relay on normally open circuit, such rear relay being also located in proximity to the rear end of such block or section, a front electric translating apparatus controlling the rear relay to close the normally open circuit thereof and located at the front end of the block or section in rear of such indicating means, a rail-circuit connected to such electric translating apparatus and including a source of electric energy and including the rails of the block or section in rear of the indicating means as the only conductors for the circuit of such electric translating apparatus from the beginning to the end of such block or section, means for operating the electric translating apparatus from the second block in rear of the indicating means and thereby closing the normally open circuit of such rear relay, and, subject to control in advance of such indicating means, putting the signal-controlling means in condition to give the one-block-clear indication, other signal-indicating means located in proximity to the rear end of the block in rear of the first-mentioned indicating means and constructed to indicate two blocks clear, and controlling means thereof controlled by the signal-controlling means first mentioned through the rail-circuit to effect the two-blocks-clear indication.

64. The combination of a normally deënergized home-signal rear relay and a normally deënergized distant-signal rear relay located in proximity to the rear end of a railway block or section, signal-indicating means controllable thereby so that the actuation of the home-signal rear relay effects the indication of one block clear and of the distant-signal rear relay effects the indication of two blocks clear, such indicating means being also located in proximity to the rear end of such block or section, circuit means adapted to be connected to the relays and including one or more sources of electric energy, and means controllable by the presence of a train in the second block in rear of the indicating means to connect the home-signal rear relay in closed circuit and controllable by the presence of a train in the block in rear of the indicating means to connect the distant-signal rear relay in closed circuit.

65. The combination of a normally deënergized home-signal rear relay and a normally deënergized distant-signal rear relay located in proximity to the rear end of a railway block or section, signal-indicating means controllable thereby so that the actuation of the home-signal rear relay effects the indication of one block clear and of the distant-signal rear relay effects the indication of two blocks clear, such indicating means being also located in proximity to the rear end of such block or section, two rail-circuits, one in advance and one in rear of the indicating means, each rail-circuit including a source of electric energy connected therein and including the rails of the block or section as the only conductors of the circuit from the beginning to the end of the block or section, an electric translating device located at the front end of the block or section in rear of the indicating means and connected in the rail-circuit thereof and controlling the rear relay and constructed to perform two operations, and means controllable by the presence of a train in the second block in rear of the indicating means for controlling the electric translating device through the rail-circuit of the block in rear of the indicating means to effect one operation of such translating device, and thereby to connect the home-signal rear relay in closed circuit with the rails of the block or section in advance of the indicating means, the electric translating device being controllable by the presence of a train in the block in rear of the indicating means to effect the other operation of such translating device, and thereby to connect the distant-signal rear relay in closed circuit with the rails of the block or section in advance of the indicating means.

66. The combination of exposed conductors of a railway block or section adapted to be bridged by a train, one or more sources of electric energy connected to the exposed conductors in proximity to the front end and in proximity to the rear end of the block or section, the connections at opposite ends of the same conductor being of like polarity and arranged to send a more powerful current to the conductors at the rear end of the block or section, and a signal controlled thereby.

67. The combination of exposed conductors of a railway block or section adapted to be bridged by a train, signal-indicating means in operative relation to such conductors and controllable thereby, one or more sources of electric energy connected to such conductors in proximity to the front end and in proximity to the rear end of the block or section, the connections at opposite ends of the same conductor being of like polarity and arranged to send a more powerful current to the conductors at the rear end of the block or section, and automatic means for substantially equalizing the powers of the opposing currents, but such means being controllable by abnormal leakage between the two exposed conductors to prevent such equalization of powers of the opposing currents.

68. The combination of exposed conductors of a railway block or section adapted to be bridged by a train, signal-indicating apparatus in operative relation to such conductors and controllable thereby, one or more sources of electric energy connected to such conductors in proximity to the front end and in proximity to the rear end of the block or section, the connections at opposite ends of the same conductors being of like polarity and arranged to send a more powerful current to the conductors at the rear end of the block or section, and automatic means for diminishing the flow of current to the conductors at the rear end of the block or section, such means being subject to control of an abnormal leakage between the two exposed conductors to prevent such automatic diminution of the flow of current to the conductors at such rear end of the block or section.

69. The combination of a relay in proximity to the front end of a railway block or section, a signal controlled by such relay, conductors connected to such relay and extending to the rear end of the block or section, and one or more sources of electric energy connected to the conductors in proximity to the front end and in proximity to the rear end of the block or section, the connections at opposite ends of the same conductor being of like polarity and arranged to send a more powerful current to the conductors at the rear end of the block or section.

70. The combination of a relay in proximity to the front end of a railway block or section, a signal controlled by such relay, conductors connected to such relay and extending to the rear end of the block or section, one or more sources of electric energy connected to the conductors in proximity to the front end and in proximity to the rear end of the block or section, the connections at opposite ends of the same conductors being of like polarity and arranged to send a more powerful current to the conductors at the rear end of the block or section, and automatic means controlled by the resistance of the circuit for substantially equalizing the opposing currents.

71. The combination of a relay in proximity to the front end of a railway block or section, a signal controlled by such relay, conductors connected to such relay and extending to the rear end of the block or section, one or more sources of electric energy connected to the conductors in proximity to the front end and in proximity to the rear end of the block or section, the connections at opposite ends of the same conductor being of like polarity and arranged to send a more powerful current to the conductors at the rear end of the block or section, and automatic means controlled by the resistance of the circuit for diminishing the flow of current to the conductors at the rear end of the block or section.

72. The combination of conductors extending along a railway block or section, a signal controllable thereby, one or more sources of electric energy connected to the conductors in proximity to the front end and in proximity to the rear end of the block or section, controlling means for such connections constructed to be controlled by a train so that the presence of a train removes the current connections at one end of the block or section and the departure of the train restores such connections.

73. The combination of conductors extending along a railway block or section, a signal controllable by such conductors, one or more sources of electric energy connected to the conductors in proximity to the front end and in proximity to the rear end of the block or section, controlling means for such connections constructed to be controlled by a train so that the presence of a train alters the normal flow of current at such connections and causes a more powerful current to flow to the conductors at one end than at the other of such block or section, and the departure of the train restores the normal flow of current at such connections.

74. The combination of conductors extending along a railway block or section, a signal controllable by such conductors, one or more sources of electric energy connected to the conductors in proximity to the front end and in proximity to the rear end of the block or section, the connections at opposite ends of the same conductor being of like polarity, an electric translating device controlling such connections at one end of the block or section so that the actuation thereof causes a more powerful current to flow to the conductors at such end than at the other end of the block or section and the further actuation thereof reduces the current flowing to the conductors at such end of the block or section.

75. The combination of the rails of a railway block or section, one or more sources of electric energy connected to the rails in proximity to the front end and in proximity to the rear end of the block or section, the connections at opposite ends of each line of rails being of like polarity, an electric translating device controlling such connections at one end of the block or section so that the actuation thereof causes a more powerful current to flow to the rails at such end than at the other end of the block or section and the further actuation thereof reduces the power of the current flowing to the rails at such end of the block or section, and a signal-indicating apparatus controllable through the rails of the block or section and by such currents.

76. The combination of conductors extending along a railway block or section, one or more sources of electric energy connected to the conductors in proximity to the front end and in proximity to the rear end of the block or section, the connections at opposite ends of the same conductor being of like polarity, an electric translating device controlling such connections at one end of the block or section so that the actuation thereof causes a more powerful current to flow to the conductors at such end than at the other end of the block or section and the further actuation thereof causes a reduction of the power of such current flowing to the conductors at such end of the block or section, and a signal in proximity to the rear end of the block or section and controlling such electric translating device so that when the signal goes to danger the current of greater power is caused to flow to the conductors.

77. The combination of the rails of a railway block or section, one or more sources of electric energy connected to the rails in proximity to the front end and in proximity to the rear end of the block or section, the connections at opposite ends of the same line of rails being of like polarity, a relay having opposed coils and an armature between its opposed coils and controlling such connections at the rear end of the block or section so that the actuation of such armature in one direction causes a more powerful current to flow to the rails at the rear end than at the front end of the block or section and the actuation of such armature in the other direction causes a reduction of the power of such current flowing to the rails at the rear end of the block or section, a signal in proximity to the rear end of the block or section and controlling such relay so that when the signal goes to danger the current of greater power is caused to flow to the rails.

78. The combination of conductors extending along a railway block or section, one or more sources of electric energy connected to the conductors in proximity to the front end and in proximity to the rear end of the block or section, an electric translating apparatus connected to the conductors in proximity to the front end of the block or section and controlling the connections at the front end of the block or section so as to send an electric current of given power and an electric current of greater power to the conductors, and an electric translating device connected to the conductors in proximity to the rear end of the block or section so as to send an electric current of given power and an electric current of greater power to the conductors, and a signal controllable by such conductors.

79. The combination of the rails of a railway block or section, one or more sources of electric energy connected to the rails in proximity to the front end and in proximity to the rear end of the block or section, the connections at opposite ends of the same line of rails being of like polarity, an electric translating apparatus connected to the rails in proximity to the front end of the block or section and controlling the connections at the front end of the block or section so as to send an electric current of given power and an electric current of greater power to the rails, and an electric translating device connected to the rails in proximity to the rear end of the block or section so as to send an electric current of given power and an electric current of greater power to the rails, and a signal controllable by current transmitted through the rails.

80. The combination of conductors extending along a railway block or section, signal-indicating apparatus controllable thereby, one or more sources of electric energy connected to the conductors in proximity to the front end and in proximity to the rear end of the block or section and arranged to normally send currents of given power to the conductors at both ends of the block or section and provided with connections capable of sending currents of greater power to the conductors at either or both ends thereof, an electric translating apparatus connected to the conductors in proximity to the front end of the block or section and controlling the connections at such end of the block or section so as to send a current of greater power than the normal current to the conductors, and an electric translating device connected to the conductors in proximity to the rear end of the block or section and controlling the connections at such end of the block or section so as to send a current of greater power than the normal current to the conductors.

81. The combination of the rails of a block or section, one or more sources of electric energy connected to the rails in proximity to the front end and in proximity to the rear end of the block or section and arranged to normally send currents of given power to the rails at both ends of the block or section and provided with connections capable of sending currents of greater power to the rails at either or both ends thereof, the connections at opposite ends of the same line of rails being of like polarity, an electric translating apparatus connected to the rails in proximity to the front end of the block or section and controlling the connections at such end of the block or section so as to send a current of greater power than the normal current to the rails, and an electric translating device connected to the rails in proximity to the rear end of the block or section and controlling the connections at such end of the block or section so as to send a current of greater power than the normal current to the rails.

82. The combination of conductors extending along a railway block or section, one or more sources of electric energy connected to such conductors in proximity to the front end and in proximity to the rear end of the block or section, the connections at opposite ends of the same conductors being of like polarity, a rear electric translating device controlling such connections at the rear end of said block or section so that the actuation thereof causes a more powerful current to flow to the conductors at the rear end than at the front end of said block or section and the further actuation thereof causes a reduction in power of the current flowing to the conductors at the rear end of the block or section, a signal in proximity to the rear end of said block or section and controlling such rear electric translating device so that when the signal goes to danger the current of greater power is caused to flow to such conductors, a signal in proximity to the advance end of such block or section and controllable by current transmitted through the said conductors extending along such block, other conductors extending along a block or section in rear of the block or section first mentioned, one or more sources of electric energy connected to such conductors in proximity to the front end and in proximity to the rear end of said rear block or section, the connections at opposite ends of the same conductors being of like polarity, another rear electric translating device controlling such connections at the rear end of the rear block or section so that the actuation thereof causes a more powerful current to flow to the conductors at the rear end of said rear block or section than at the front end thereof and the further actuation causes reduction of the power of such current flowing to the conductors at the rear end of said rear block or section, and a front electric translating apparatus at the front end of said rear block or section and connected to the conductors thereof and controlled by the rear electric translating device of said rear block or section and controlling the signal at the rear end of the advance block or section so that the current of greater power assures the actuation of the front electric translating apparatus which will cause the signal to go to danger.

83. The combination of exposed conductors extending along a railway block or section and constructed to be bridged by a train, one or more sources of electric energy connected to the conductors in proximity to the front end and in proximity to the rear end of the block or section, the connections at opposite ends of the same conductors being of like polarity, a rear electric translating device controlling such connections at the rear end of the block or section so that the actuation thereof causes a more powerful current to flow to the conductors at the rear end than at the front end of such block or section and the further actuation thereof causes a reduction of such current flowing to the conductors at the rear end of the block or section, a front relay having opposed electromagnets and an armature between said electromagnets and connected with such conductors so that the conductors are comprised in a branch of part of the circuit of said relay excluding one of such electromagnets, and a signal-circuit controlled by said relay.

84. The combination of exposed conductors extending along a railway block or section and constructed to be bridged by a train, one or more sources of electric energy connected to such conductors in proximity to the front end and in proximity to the rear end of the block or section, the connections at opposite ends of the same conductors being of like polarity, a rear electric translating device controlling such connections at the rear end of said block or section so that the actuation thereof causes a more powerful current to flow to the conductors at the rear end than at the front end of said block or section and the further actuation thereof causes a reduction of said more powerful current, a signal in proximity to the rear end of said block or section and controlling such rear electric translating device so that when the signal goes to danger the current of greater power is caused to flow to such conductors, a front relay having opposed electromagnets and an armature between said electromagnets and connected with such conductors so that the conductors form a branch of part of the circuit of said relay excluding one of such electromagnets, and a signal-circuit controlled by said relay, other like exposed conductors extending along a block or section in rear of the block or section first mentioned, one or more sources of electric energy connected to such conductors in proximity to the front end and in proximity to the rear end of said rear block or section, the connections at opposite ends of the same conductors being of like polarity, another rear electric translating device controlling such connections at the rear end of the rear block or section so that the actuation thereof causes a more powerful current to flow to the conductors at the rear end of said rear block or section than at the front end thereof and the further actuation thereof causes a reduction of said more powerful current, and a front relay of said rear block or section having opposed electromagnets and connected with the exposed conductors thereof so that the conductors form a branch of part of the circuit of said relay excluding one of such electromagnets, such front relay controlling the signal at the rear end of the advance block or section so that the current of greater power assures the actuation of the front relay which will cause the signal to go to danger.

85. The combination of a railway block or section having a switch therein, a signal in proximity to the rear end of the block or section, a switch-controlling device in proximity to the switch, a rail-circuit including the rails of the block or section as continuous conductors from the beginning to the end of the block or section, and signal-controlling means controlled by such rail-circuit and including a signaling-circuit which has to be closed for a safety indication of the signal, the signaling-circuit having a contact device therein controlled by the movement of the switch so that the opening of the switch prevents the closing of the signaling-circuit.

86. The combination of a railway block or section having a switch therein, a normal danger-signal in proximity to the rear end of the block or section, a switch-controlling device in proximity to the switch, a rail-circuit including the rails of the track of the block or section as continuous conductors from the beginning to the end of the block or section, and signal-controlling means controlled by such rail-circuit and including a signaling-circuit which has to be closed for a safety indication of the signal, this signaling-circuit having a contact device therein controlled by the movement of the switch so that the opening of the switch prevents the closing of the signaling-circuit, and the signal-controlling means controlling the switch-controlling device so as to prevent the safety operation of the switch-controlling device when the signal-controlling means are in the safety condition.

87. The combination of a railway block or section having a switch therein, a signal in proximity to the rear end of the block or section, a switch-controlling device in proximity to the switch, a rail-circuit including the rails of the track of the block or section as continuous conductors from the beginning to the end of the block or section, signal-controlling means of such signal controlled by such rail-circuit and including a signaling-circuit which has to be closed for a safety indication of the signal, another signal located at a distance in rear of the signal first mentioned and controlling means thereof also including a controlling-circuit which has to be closed for a safety indication of such signal, the signaling-circuit of the first-mentioned signal and the controlling-circuit of the last-mentioned signal each having a contact device therein controlled by the movement of the switch so that the opening of the switch prevents the closing of both of such circuits.

88. The combination of a railway block or section having a switch therein, a normal danger-signal in proximity to the rear end of the block or section, a switch-controlling device in proximity to the switch, a rail-circuit including the rails of the track of the block or section as continuous conductors from the beginning to the end of the block or section, signal-controlling means of such signal controlled by such rail-circuit and including a signaling-circuit which has to be closed for the safety indication of the signal, another signal located in proximity to the rear end of the block in rear of the signal first mentioned and constructed to indicate two blocks clear, and controlling means thereof also including a controlling-circuit which has to be closed for the one-block-clear indication of such signal, the signaling-circuit of the first-mentioned signal and the controlling-circuit of the last-mentioned signal each having a contact device therein controlled by the movement of the switch so that the opening of the switch prevents the closing of both of such circuits, and the signal-controlling means of the advance signal controlling the switch-controlling means so as to prevent the safety operation of the signal-controlling device when the signal is at safety.

89. The combination of a railway block or section having a switch therein, a signal in proximity to the rear end of the block or section, a switch-controlling device in proximity to the switch, a switch rear relay controlling the switch-controlling device and located in proximity to the rear end of the block or section and a normally closed circuit therefor, and signal-controlling means controlled by the approach of a train and controlling the switch rear relay to open the circuit thereof upon the approach of a train.

90. The combination of a railway block or section having a switch therein, a signal in proximity to the rear end of the block or section, a switch-controlling device in proximity to the switch, a switch rear relay controlling the switch-controlling device and located in proximity to the rear end of the block or section, a rail-circuit including the rails of the block or section as the only conductors thereof from the beginning to the end of the block or section, the switch rear relay being connected in a normally closed branch of such circuit, and signal-controlling means including a signal rear relay connected in a normally open branch of such rail-circuit and controlled by the approach of a train and controlling the switch rear relay to open the circuit thereof upon the approach of a train.

91. The combination of a railway block or section having a switch therein, a signal in proximity to the rear end of the block or section, conductors of such block or section, signal-controlling means including a relay connected to such conductors, a switch-controlling device in proximity to the switch, and two line-wires extending from the switch-controlling device to the signal and connected to the switch-controlling device and forming a separate line-circuit for the switch-controlling device only, such line-circuit being controlled by the signal-controlling means.

92. The combination of a railway block or section having a switch therein, a signal in proximity to the rear end of the block or section, conductors of such block or section and signal-controlling means connected thereto and forming a normally open signal-circuit, a switch-controlling device in proximity to the switch, two line-wires extending from the switch-controlling device to the signal and connected to the switch-controlling device and forming a separate line-circuit for the switch-controlling device only, such line-circuit being normally closed, and a relay at the signal and controlling the signal-circuit and the switch-line circuit so that the closing of the signal-circuit is dependent upon the opening of the switch-line circuit.

93. The combination of a railway block or section having a switch therein, railway signal-indicating means constructed to indicate one block clear and located in proximity to the rear end of the block or section and controlling means therefor, a switch-controlling device in proximity to the switch, other signal-indicating means located in proximity to the rear end of the block in rear of the first-mentioned indicating means and constructed to indicate one block clear and two blocks clear and controlling means therefor, means controlled by the presence of a train in the block in rear of such last-mentioned indicating means, subject to the control of a train in advance of the first-mentioned indicating means and of the switch-controlling device, for putting the signal-controlling means first mentioned in condition to give the one-block-clear indication and controlling the signal-controlling means last mentioned to effect the two-blocks-clear indication, the first-mentioned signal-controlling means controlling the switch-controlling device so as to put the switch-controlling device in the danger condition when the signal is at safety, and the last-mentioned controlling means not controlling the switch-controlling device.

94. The combination of two railway traffic-controlling devices disposed one in advance of the other along one railway-track, two relays, one for each traffic-controlling device, electric conductors common to both relays along the line and means for separately controlling one of such relays, the two relays having a single armature controlled by both relays and controlling both of such traffic-controlling devices.

95. The combination of a railway block or section having a switch therein, a signal in proximity to the rear end of the block or section, a switch-controlling device in proximity to the switch, a signal rear relay and a switch rear relay, conductors of the block or section common to both relays, and means for separately controlling one of such rear relays, the two rear relays having a single armature controlled by both rear relays and controlling both the signal and the switch-controlling device.

96. The combination of a railway block or section having a switch therein, a signal in proximity to the rear end of the block or section, a switch-controlling device in proximity to the switch, a signal rear relay and a switch rear relay, the rails of the block or section forming the only conductors of the circuits of the two rear relays from the beginning to the end of the block or section, and means for separately controlling one of such rear relays, the two rear relays having a single armature controlled by both rear relays and controlling both the signal and the switch-controlling device.

97. The combination of a railway block or section having a switch therein, a signal in proximity to the rear end of the block or section, a normally deënergized signal-relay and a normally energized switch-relay, conductors of the block or section common to both relays, and means for separately controlling one of such relays, the two relays having a single armature controlled by both relays and controlling both the signal and the switch-controlling device.

98. The combination of a railway block or section having a switch therein, a signal in proximity to the rear end of the block or section, a switch-controlling device in proximity to the switch, a normally deënergized signal rear relay and a normally energized switch rear relay, the rails of the block or section forming the only conductors of the circuits of the two rear relays from the beginning to the end of the block or section, and means for separately controlling one of such rear relays, the two rear relays having a single armature controlled by both relays and controlling both the signal and the switch-controlling device.

99. The combination of a railway block or section having a switch therein, a signal in proximity to the rear end of the block or section, a switch-controlling device in proximity to the switch, exposed conductors of the block or section constructed to be bridged by a train, a source of electric energy, a rear electric translating apparatus controlling both the switch-controlling device and the signal, normally closed connections from such source of electric energy through the exposed conductors and electric translating device, means controlled by a train in rear of the block or section, for opening such connections and opposing an electric current between the electric translating apparatus and the exposed conductors, subject to the shunting action of a train in the block or section, and signal-controlling means controlled by the reënergization and actuation of the electric translating apparatus by such opposed current, whereby the signal cannot be actuated until the shunting action of the train in the block or section is removed.

100. The combination of a railway block or section having a switch therein, a signal in proximity to the rear end of the block or section, a switch-controlling device in proximity to the switch and including a contact device controlled by the switch so as to be held open when the switch is open, exposed conductors of the block or section constructed to be bridged by a train, a source of electric energy, a rear electric translating apparatus controlling both the switch-controlling device and the signal, normally closed connections from such source of electric energy through the exposed conductors and electric translating apparatus, means controlled by a train in rear of the block or section and including a circuit through such switch-controlled contact device for opening such connections and opposing an electric current between the electric translating apparatus and the exposed conductors, subject to the shunting action of a train in the block or section, and signal-controlling means controlled by the reënergization and actuation of the electric translating apparatus by such opposed current whereby the signal cannot be actuated unless the switch-controlled contact device is closed and until the shunting action of the train in the block or section is removed.

101. The combination of a railway block or section having a switch therein, a signal in proximity to the rear end of the block or section, a switch-controlling device in proximity to the switch and including a circuit-contact device controlled by the switch so as to be held open when the switch is open, the rails of the block or section, a source of electric energy connected thereto in proximity to the front end of the block or section, a rear electric translating apparatus controlling both the switch-controlling device and the signal, normally closed connections from the rails to the electric translating apparatus in proximity to the rear end of the block or section, means controlled by a train in rear of the block or section and including a circuit through the switch-controlled contact device, for opening such connections and opposing an electric current between the electric translating apparatus and the rails and controlled by such electric translating apparatus to open the circuit of such opposed current, and signal-controlling means controlled by the reenergization and actuation of the electric translating apparatus by such opposed current.

102. The combination of a railway block or section having a switch therein, a signal in proximity to the rear end of the block or section, conductors of such block or section, signal-controlling means including a relay connected to such conductors, a switch-controlling device in proximity to the switch, and a separate circuit extending from the switch-controlling device to the signal and controlled by the signal-controlling means.

103. The combination of a railway block or section having a switch therein, a signal in proximity to the rear end of the block or section, conductors of such block or section, signal-controlling means including a normally deënergized relay connected to such conductors, a switch-controlling device in proximity to the switch, and a separate normally closed circuit extending from the switch-controlling device to the signal and controlled by the signal-controlling means.

104. The combination of a railway block or section having a switch therein, a signal in proximity to the rear end of the block or section, a circuit of such block or section including the rails of the block or section as the only conductors thereof from the beginning to the end of the block or section and signal-controlling means including a signal rear relay connected in such rail-circuit, a switch-controlling device in proximity to the switch, and a separate circuit extending from the switch-controlling device to the signal and controlled by the signal-controlling means.

105. The combination of a railway block or section having a switch therein, railway signal-indicating means constructed to indicate one block clear and located in proximity to the rear end of the block or section and controlling means therefor, a switch-controlling device in proximity to the switch, a block or section in rear of the first-mentioned block or section, signal-indicating means located in proximity to the rear end of such last-mentioned block or section and constructed to indicate one block clear and two blocks clear and controlling means therefor, circuit means controlled by the presence of a train in the block in rear of the last-mentioned block, subject to the control of a train in advance of the first-mentioned indicating means and of the switch-controlling device, to put the signal-controlling means first mentioned in condition to give the one-block-clear indication and controlling the signal-controlling means last mentioned to effect the two-blocks-clear indication, the first-mentioned signal-controlling means controlling the switch-controlling device so as to put the switch-controlling device in the danger condition when the signal is at safety and the last-mentioned signal-controlling means not controlling the switch-controlling device, and the rails of the block or section in rear of the first-mentioned block or section constituting the only electrical conductors of the circuit means from the beginning to the end of the block or section.

106. The combination of a railway block or section having a switch therein, railway signal-indicating means constructed to indicate one block clear and located in proximity to the rear end of such block or section, controlling means for such signal including a rear relay on normally open circuit, a switch-controlling device in proximity to the switch, a block or section in rear of the first-mentioned block or section, signal-indicating means located in proximity to the rear end of such last-mentioned block or section and constructed to indicate one block clear and two blocks clear, controlling means for such last-mentioned signal including a normally deënergized rear relay, circuit means controlled by the presence of a train in the block in rear of the last-mentioned block or section for closing the normally open circuit of the first-mentioned rear relay and, subject to the control of a train in advance of the first-mentioned indicating means and of the switch-controlling device, putting the signal-controlling means first mentioned in condition to give the one-block-clear indication and controlling the signal-controlling means last mentioned to effect the two-blocks-clear indication, the first-mentioned signal-controlling means controlling the switch-controlling device so as to put the switch-controlling device in the danger condition when the signal is at safety and the last-mentioned signal-controlling means not controlling the switch-controlling device, and the rails of the block or section in rear of the first-mentioned block or section constituting the only electrical conductors of the circuit means from the beginning to the end of the block or section.

107. The combination of railway signal-indicating means and a circuit-controlling the same, such circuit including a source of electric energy of given power, a source of electric energy of greater power and means controlled by the approach of a train for connecting the source of greater power in such circuit and continuing the source of lesser power in circuit until the source of greater power is connected in such circuit.

108. The combination of railway signal-indicating means counterweighted to go to danger, electrically-controlled actuating means therefor, an electrically-controlled clutch controlling the movement of the signal to safety, a circuit controlling the actuating means and clutch, such circuit including a source of electric energy of given power and a source of electric energy of greater power, and means controlled by the approach of a train for connecting the source of greater power in such circuit and continuing the source of lesser power in circuit until the source of greater power is connected in such circuit.

109. The combination of railway signal-indicating means counterweighted to go to danger, electrically-controlled actuating means therefor, an electrically-controlled clutch controlling the movement of the signal to safety, a relay located at a distance in advance of the signal and having an armature and front and back contacts, such contacts being arranged so that one is not opened by the movement of the armature until after the other has been closed by such movement, a circuit controlling the actuating means and clutch, means including one of the contacts of such relay for energizing such circuit with an electric current of given power, and means including the other contact of such relay for energizing such circuit with an electric current of greater power.

110. The combination of a series of railway signal-indicating means located along a railway-line, a relay and its armature for each signal-indicating means, the armature controlling the indicating means to cause a clear indication thereof by the attraction of the armature, and means for diminishing the current through the coils of each of such relays for holding the armature forward after the armature has been attracted.

111. The combination of a series of railway signal-indicating means located along a railway-line, a relay having opposed coils and an armature between said coils for each signal-indicating means, the armature controlling the indicating means to cause a clear indication by the attraction of the armature toward the front coils of the relay, and means for diminishing the current through the front coils of each of said relays after the armature has been attracted.

112. The combination of a railway-signal, actuating mechanism therefor, a relay and its armature controlling the signal-actuating mechanism to cause a clear indication of the signal by the attraction of the armature, another signal and actuating mechanism therefor located in rear of the first-mentioned signal, and means controlled by the movement of the last-mentioned signal-actuating mechanism and controlling the relay to diminish the current through the coils of the relay for holding the armature forward after the armature has been attracted.

113. The combination of a railway-signal, actuating mechanism therefor, a relay having opposed coils and an armature between such coils, the armature controlling the signal-actuating mechanism to cause a clear indication by the attraction of the armature toward the front coils of the relay, another signal and actuating mechanism therefor located in rear of the first-mentioned signal, and means controlled by the movement of the last-mentioned signal-actuating mechanism and controlling the relay to diminish the current through the front coils after the armature has been attracted.

114. An electric railway signaling system comprising a plurality of successive railway-blocks, successive signal-indicating apparatuses interposed between such blocks and each controllable from each of a plurality of blocks in rear, and a single pair of conductors leading from each signal-indicating apparatus to each adjacent signal-indicating apparatus and comprising all the means of electric intercommunication between them.

115. An electric railway signaling system comprising a plurality of railway-blocks, signal-indicating apparatuses located between such blocks, each of such apparatuses being controllable from, and by the several conditions of, each of a plurality of blocks in advance, and also controllable from a block in rear, and single pairs of conductors interposed between adjacent signal-indicating apparatuses and comprising all their means of electric intercommunication.

116. An electric railway signaling system comprising a plurality of railway-blocks, signal-indicating apparatuses interposed between adjacent blocks and each controllable from, and by the several conditions of, each of a plurality of blocks in advance, and also controllable from each of a plurality of blocks in rear, and a single pair of conductors leading from each signal-indicating apparatus to each immediately adjacent signal-indicating apparatus and comprising all their means of electric intercommunication.

117. An electric railway signaling system comprising a plurality of successive railway-blocks, successive signal-indicating apparatuses interposed between such blocks and each controllable from each of a plurality of blocks in rear, and a rail-circuit leading from each signal-indicating apparatus to each adjacent signal-indicating apparatus and including the rails of the railway-track, such rails comprising all the means of electric intercommunication between such signal-indicating apparatuses.

118. An electric railway signaling system comprising a plurality of railway-blocks, signal-indicating apparatuses located between such blocks, each of such apparatuses being controllable from, and by the several conditions of, each of a plurality of blocks in advance, and also controllable from a block in rear and rail-circuits interposed between adjacent signal-indicating apparatuses and including the rails of the railway-track, as conductors, such rails comprising all the means of electric intercommunication between such signal-indicating apparatuses.

119. An electric railway signaling system comprising a plurality of railway-blocks, signal-indicating apparatuses interposed between adjacent blocks and each controllable from, and by the several conditions of, each of a plurality of blocks in advance, and also controllable from each of a plurality of blocks in rear, and a rail-circuit including the rails of the railway-track as conductors, leading from each signal-indicating apparatus to each immediately-adjacent signal-indicating apparatus, such rail-circuits comprising all the means of electric intercommunication between the signal-indicating apparatuses.

120. A normal danger electric railway signaling system comprising a plurality of successive railway-blocks, successive normal danger-signal-indicating apparatuses interposed between such blocks and each such apparatus being controllable from each of a plurality of blocks in rear to give a clear indication and a single pair of conductors leading from each signal-indicating apparatus to each adjacent signal-indicating apparatus and comprising all the means of electric intercommunication between such signal-indicating apparatuses.

121. A normal danger electric railway signaling system comprising a plurality of railway-blocks, normal danger-signal-indicating apparatuses located between such blocks, each of such apparatuses being controllable from a block in rear to give a clear indication subject to joint control from, and by the several conditions of, each of a plurality of blocks in advance, and single pairs of conductors interposed between adjacent signal-indicating apparatuses, such conductors comprising all means of electric intercommunication between them.

122. A normal danger electric railway signaling system comprising a plurality of railway-blocks, normal danger-signal-indicating apparatuses interposed between adjacent blocks and each controllable to give a clear indication from each of a plurality of blocks in rear, subject to joint control from, and by the several conditions of, each of a plurality of blocks in advance, and a single pair of conductors leading from each signal-indicating apparatus to each immediately-adjacent signal-indicating apparatus and comprising all means of electric intercommunication between such signal-indicating apparatuses.

123. An electric normal danger railway block-signaling system comprising a signal-indicating apparatus indicative of the several conditions of each of a plurality of blocks in advance of such signal-indicating apparatus, a controlling-circuit in controlling relation to such signal-indicating apparatus and provided with a source of electric current having a number of controllable characteristics, such controlling-circuit being governable by presence of a train in any one of the said advance blocks to influence or control a corresponding one of the aforementioned controllable characteristics of the current, and each indication of the signal-indicating apparatus being controllable by a corresponding one of the said current characteristics.

124. An electric normal danger railway block-signaling system comprising a signal-indicating apparatus indicative of and governable by the several conditions of each of a plurality of blocks in advance of such signal-indicating apparatus, a controlling-circuit in controlling relation to such signal-indicating apparatus and provided with a source of electric current having a number of controllable characteristics, such controlling-circuit being governable by presence of a train in any one of the said advance blocks to influence or control a corresponding one of the aforementioned controllable characteristics of the current, and each indication of the signal-indicating apparatus being controllable by a corresponding one of the said current characteristics.

In testimony whereof I have affixed my signature in presence of two witnesses.

HENRY BEZER.

Witnesses:
HENRY D. WILLIAMS,
HENRY BARNES.